United States Patent
Tsou et al.

(10) Patent No.: US 10,822,440 B2
(45) Date of Patent: Nov. 3, 2020

(54) DUAL METALLOCENE-CATALYZED BIMODAL COPOLYMER COMPOSITIONS

(71) Applicant: ExxonMobil Chemical Patents Inc., Baytown, TX (US)

(72) Inventors: Andy H. Tsou, Houston, TX (US); Periagaram S. Ravishankar, Kingwood, TX (US); Jo Ann M. Canich, Houston, TX (US); Francis C. Rix, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 119 days.

(21) Appl. No.: 16/315,090

(22) PCT Filed: Jun. 14, 2017

(86) PCT No.: PCT/US2017/037490
§ 371 (c)(1),
(2) Date: Jan. 3, 2019

(87) PCT Pub. No.: WO2018/013285
PCT Pub. Date: Jan. 18, 2018

(65) Prior Publication Data
US 2019/0225722 A1  Jul. 25, 2019

Related U.S. Application Data

(60) Provisional application No. 62/362,364, filed on Jul. 14, 2016.

(51) Int. Cl.
*C08F 210/16* (2006.01)
*C10M 143/02* (2006.01)
(Continued)

(52) U.S. Cl.
CPC ........ *C08F 210/16* (2013.01); *C08F 4/65927* (2013.01); *C10M 143/02* (2013.01);
(Continued)

(58) Field of Classification Search
CPC ............ C08F 210/16; C08F 4/65927; C08F 4/65908; C08F 2500/02; C08F 2500/04;
(Continued)

(56) References Cited

U.S. PATENT DOCUMENTS 4,438,238 A * 3/1984 Fukushima ........... C08F 210/16
264/331.17
5,795,941 A † 8/1998 Cree
(Continued)

FOREIGN PATENT DOCUMENTS

JP          8239416       9/1996
WO       2015/009832      1/2015
WO    WO 2015/009832 A1 * 1/2015

OTHER PUBLICATIONS

Garcia-Franco, et al. "Relative quantification of long chain branching in essentially linear polyethylenes." European Polymer Journal, vol. 44, pp. 376-391 (2008).†

*Primary Examiner* — William K Cheung

(57) ABSTRACT

This application relates to copolymer compositions and copolymerization processes. The processes may use two different metallocene catalysts: one capable of producing high molecular weight copolymers; and one suitable for producing lower molecular weight copolymers having at least a portion of vinyl terminations, and the copolymer compositions produced thereby. Copolymer compositions may comprise (1) a first ethylene copolymer fraction having high molecular weight, exhibiting branching topology, and having relatively lower ethylene content (based on the weight of the first ethylene copolymer fraction); and (2) a second ethylene copolymer fraction having low molecular (Continued)

weight, exhibiting linear rheology, and having relatively higher ethylene content (based on the weight of the second ethylene copolymer fraction). It is believed that the unique combination of these properties provides a copolymer composition with advantageous viscosity modifying properties, such as an excellent combination of shear thinning and fuel economy, as well as high thickening efficiency.

19 Claims, 7 Drawing Sheets

(51) Int. Cl.
| | |
|---|---|
| *C10M 143/06* | (2006.01) |
| *C10M 143/04* | (2006.01) |
| *C10M 143/08* | (2006.01) |
| *C10M 171/02* | (2006.01) |
| *C10M 171/04* | (2006.01) |
| *C08F 4/6592* | (2006.01) |
| *C08F 4/659* | (2006.01) |
| *C10N 20/00* | (2006.01) |
| *C10N 20/02* | (2006.01) |
| *C10N 20/04* | (2006.01) |
| *C10N 30/02* | (2006.01) |
| *C10N 30/08* | (2006.01) |
| *C10N 30/00* | (2006.01) |
| *C10N 40/25* | (2006.01) |
| *C10N 70/00* | (2006.01) |

(52) U.S. Cl.
CPC ........ *C10M 143/04* (2013.01); *C10M 143/06* (2013.01); *C10M 143/08* (2013.01); *C10M 171/02* (2013.01); *C10M 171/04* (2013.01); *C08F 4/65908* (2013.01); *C08F 2500/02* (2013.01); *C08F 2500/04* (2013.01); *C08F 2500/05* (2013.01); *C08F 2500/09* (2013.01); *C08F 2500/17* (2013.01); *C08F 2800/20* (2013.01); *C10M 2205/022* (2013.01); *C10M 2205/024* (2013.01); *C10M 2205/026* (2013.01); *C10M 2205/028* (2013.01); *C10M 2205/0285* (2013.01); *C10M 2207/289* (2013.01); *C10M 2223/049* (2013.01); *C10N 2020/01* (2020.05); *C10N 2020/019* (2020.05); *C10N 2020/02* (2013.01); *C10N 2020/04* (2013.01); *C10N 2020/069* (2020.05); *C10N 2020/071* (2020.05); *C10N 2030/02* (2013.01); *C10N 2030/08* (2013.01); *C10N 2030/54* (2020.05); *C10N 2030/68* (2020.05); *C10N 2040/25* (2013.01); *C10N 2070/00* (2013.01)

(58) Field of Classification Search
CPC .............. C08F 2500/05; C08F 2500/09; C08F 2500/17; C08F 2800/20; C10M 143/02; C10M 143/04; C10M 143/06; C10M 143/08; C10M 171/02; C10M 171/04; C10M 2205/022; C10M 2205/024; C10M 2205/026; C10M 2205/028; C10M 2205/0285; C10M 2207/289; C10M 2223/049; C10N 2030/68; C10N 2030/54; C10N 2030/02; C10N 2030/08; C10N 2020/069; C10N 2020/019; C10N 2020/02; C10N 2020/04; C10N 2040/25; C10N 2070/00
USPC .......................................................... 526/119
See application file for complete search history.

(56) References Cited

U.S. PATENT DOCUMENTS

| | | | |
|---|---|---|---|
| 6,506,857 | B2 | 1/2003 | Rix et al. |
| 6,875,816 | B2 | 4/2005 | DeGroot et al. |
| 6,924,342 | B2 | 8/2005 | Stevens et al. |
| 7,999,039 | B2 | 8/2011 | DeGroot et al. |
| 8,318,998 | B2 | 11/2012 | Crowther et al. |
| 8,524,793 | B2 † | 9/2013 | Peng |
| 8,829,127 | B2 | 9/2014 | Dharmarajan et al. |
| 2012/0245311 | A1 | 9/2012 | Crowther et al. |
| 2013/0065035 | A1 † | 3/2013 | Van Loon |
| 2014/0051809 | A1 | 2/2014 | Tse |
| 2015/0025209 | A1 | 1/2015 | Canich et al. |

\* cited by examiner
† cited by third party

Intrinsic Viscosity vs. Molecular Weight
by MALLS/3D Analysis

Intrinsic Viscosity vs. Molecular Weight
by MALLS/3D Analysis

Intrinsic Viscosity vs. Molecular Weight
by MALLS/3D Analysis

DUAL METALLOCENE-CATALYZED BIMODAL COPOLYMER COMPOSITIONS

PRIORITY CLAIM

This application claims priority to U.S. Provisional Application Ser. No. 62/362,364 filed Jul. 14, 2016, the disclosures of which are fully incorporated herein by their reference.

CROSS-REFERENCE OF RELATED APPLICATIONS

This application is a National Phase Application claiming priority to PCT Application Serial No. PCT/US2017/037490 filed Jun. 14, 2017, which claims priority to U.S. Provisional Application No. 62/362,364 filed Jul. 14, 2016, the disclosure of which is incorporated herein by reference.

FIELD OF THE INVENTION

This invention relates to the use of two metallocene catalyst systems in combination to produce bimodal ethylene-based copolymer compositions which may be particularly useful as viscosity modifiers useful in modifying the rheological properties of lubrication fluids.

BACKGROUND OF THE INVENTION

Conventional polyolefin viscosity modifiers are OCP, or olefin copolymers, based on ethylene alpha olefin copolymers or propylene alpha olefin copolymers. Larger coil dimensions of these copolymers in a hydrocarbon solvent provide excellent thickening efficiency. However, they are linear and mono-modal in molecular weight distribution. Long chain branched viscosity modifiers presently in the market place are multi-arm stars based on poly(hydrogenated isoprene-co-styrene) copolymers with hydrogenated polyisoprene (with alternated ethylene-propylene composition after hydrogenation) star arms of 20 to 40 centered on a crosslinked polystyrene core. These long chain branches deliver earlier shear thinning onset in a hydrocarbon basestock for lower viscosity at high shear rates and better fuel economy. However, their thickening efficiency is poor due to their star shape (long chain branches reduce polymer coil dimensions) and they are easily oxidized and degraded as a result of the ease of oxidation in polystyrene.

It is therefore a continued desire in the industry to discover copolymer compositions, and particularly metallocene-catalyzed olefin copolymer compositions, that deliver both excellent thickening efficiency and fuel economy qualities for, e.g., lubricating oil compositions.

Along these and similar lines, some relevant publications include US Patent Publication No. US 2015/0025209 as well as those identified in Paragraphs [0005]-[0011] in US 2015/0025209 (incorporated by reference herein); WIPO Publication No. WO 2015/009832 as well as the publications identified in Paragraph [0004] of WO 2015/009832 (incorporated by reference herein); and also the following: US Patent Publication Nos. 2012/0245311, 2014/0051809; U.S. Pat. Nos. 6,506,857, 6,875,816, 6,924,342, 7,999,039, 8,318,998, 8,829,127; and Japan unexamined patent publication Hei 8-239416.

The present inventors have found a dual metallocene catalyst reaction system to be particularly useful in creating certain advantageous metallocene polymer compositions. In particular, the present inventors have found it advantageous to carry out polymerizations using a dual metallocene catalyst system comprising a first and a second metallocene catalyst. The second metallocene catalyst makes linear, low molecular weight, high C2 (ethylene) and vinyl-terminated polyolefin copolymer, while the first catalyst incorporates thusly made vinyl terminated polyolefin copolymers into larger copolymer chains by copolymerizing them with other monomers. In some aspects, it is believed these larger copolymer chains incorporating the vinyl terminated polyolefin copolymers have a comb branched structure. Long chain branches from combs do not shrink the polymer solution coil as severely as the long chain branches from stars. Additional advantages result when some portion of the linear low molecular weight copolymer produced by the second metallocene catalyst is not incorporated into the high molecular weight fraction's chains. This provides a bimodal copolymer composition comprising some portion of the linear low molecular weight copolymer. Advantageously, such low molecular weight copolymers may have higher relative ethylene content (as compared to the higher molecular weight fraction). Since polyethylenes are believed to swell the most in viscosity modifier applications, the low molecular weight, high-ethylene linear fractions may serve to raise the thickening efficiency of the copolymer composition, while the copolymer composition retains the shear thinning and fuel economy benefits of the comb-branched, high molecular weight fraction.

SUMMARY OF THE INVENTION

Accordingly, the present invention in some aspects employs a dual metallocene catalyst system to make a bimodal olefin copolymer composition. The dual metallocene catalyst system includes (1) a first metallocene catalyst capable of producing high molecular-weight polymer chains, and in particular capable of incorporating vinyl-terminated hydrocarbon chains into the growing high molecular-weight polymer chain; and (2) a second metallocene catalyst capable of producing lower molecular-weight polymer chains, and which further generates a relatively high percentage of vinyl-terminated polymer chains. The first metallocene catalyst in some aspects is a bridged fluorenyl-cyclopentadienyl (Cp) group 4 complex, although other classes of metallocene catalyst (e.g., mono-Cp amido group 4 complexes, biphenyl phenol transition metal complexes, or pyridyl amide and/or diamide transition metal complexes) may be suitable. The second metallocene catalyst in some aspects is a bis-indenyl transition metal complex.

Polymerization processes according to certain aspects include copolymerizing two or more alpha olefin monomers (one of which is preferably ethylene; the other in some aspects may be a $C_3$-$C_{12}$ α-olefin, preferably propylene) in the presence of the first and second metallocene catalysts, and the resulting bimodal olefin copolymer compositions. In some aspects, the bimodal olefin copolymer compositions may be ethylene copolymer compositions (preferably ethylene-α-olefin copolymer compositions, such as ethylene-propylene copolymer compositions). Such ethylene copolymer compositions comprise (1) a first fraction having high molecular weight and a first ethylene content within the range from 50 to 60 wt %, based on mass of the first fraction; and (2) a second fraction having low molecular weight and second ethylene content that is higher than the ethylene content of the first fraction (e.g., at least 5, such as at least 7 wt % higher than the ethylene content of the first fraction, said wt % based on the mass of the second fraction). The first fraction according to certain aspects may have a comb-branched structure, while the second fraction may be linear. In certain aspects, then, the first fraction may be characterized by having branching index g' lower than the branching index g' of the second fraction. For instance, g' of the first fraction may be less than or equal to 0.95, while g' of the second fraction may be greater than 0.95, such as within the range from 0.98 to 1.

In polymerization processes according to certain embodiments, polymerization is controlled so as to obtain the aforementioned copolymer compositions, e.g., based at least in part upon molar or weight ratio of the first catalyst to the second catalyst. Preferably, the polymerization takes place in a single polymerization reaction zone, e.g., a single polymerization reactor.

Careful control of these parameters using the dual catalyst systems of various embodiments herein enables one to obtain metallocene-catalyzed polymers of particularly advantageous properties, and suitable for deployment in a wide variety of applications, depending upon the polymerization conditions used.

Without wishing to be bound by theory, it is believed that the polymer compositions obtained in various aspects, including those noted above, exhibit their advantageous and surprising properties owing at least in part to the excellent degree of branching obtained when using a dual metallocene catalyst system including the first and second metallocene catalysts in accordance with various embodiments of the present invention. This enables the control of the polymerization, including of the catalyst ratio and other parameters, to obtain polymer compositions that exhibit advantageous properties for various target applications, as may be tailored by, e.g., targeting the desired molecular weight and branching bimodalities.

DETAILED DESCRIPTION

Figure 1A:
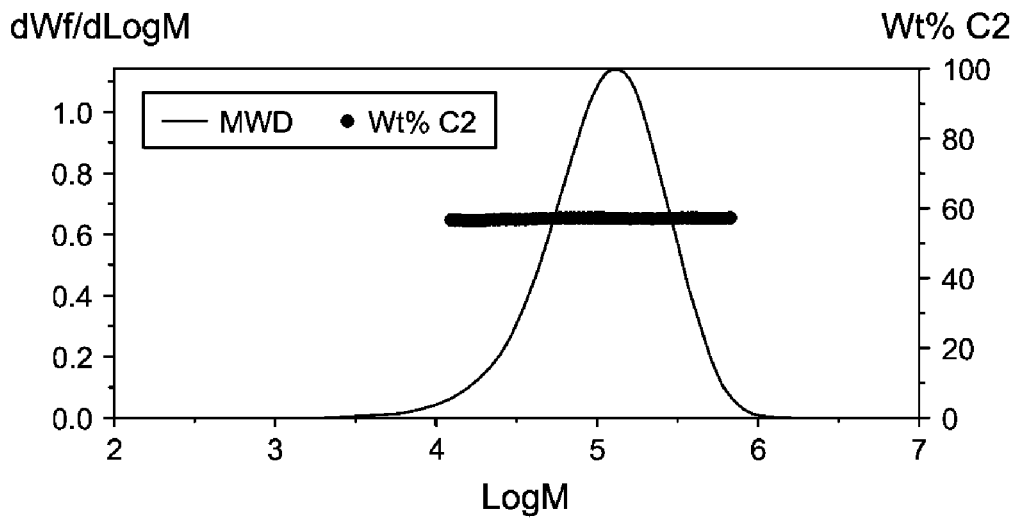
FIG. 1a and FIG. 1b are GPC-4D and GPC-3D plots, respectively, of a copolymer composition as described in Example 1.

Processes of various embodiments employ dual metallocene catalyst polymerization, preferably in a single polymerization reaction zone, so as to obtain ethylene copolymer compositions having (1) a first ethylene copolymer fraction having high molecular weight, exhibiting branching topology, and having relatively lower ethylene content (based on the weight of the first ethylene copolymer fraction); and (2) a second ethylene copolymer fraction having low molecular weight, exhibiting linear rheology, and having relatively higher ethylene content (based on the weight of the second ethylene copolymer fraction). The dual metallocene catalyst polymerization includes polymerization of ethylene and one or more additional α-olefin monomers (preferably propylene) in the presence of a first metallocene catalyst and a second metallocene catalyst. In particular embodiments, the molar ratio of the first to the second metallocene catalyst is adjusted, maintained, or otherwise controlled so as to obtain the desired copolymer composition having the first and second fractions.

Ethylene copolymer compositions produced by such dual catalyst systems and having the recited first and second fractions may be used as viscosity modifiers that advantageously exhibit both (1) good shear thinning and fuel economy (e.g., due at least in part to the presence of the lower-ethylene content, branched, high molecular weight first fraction) and (2) good thickening efficiency (e.g., due at least in part to the presence of the higher-ethylene content, linear, low molecular weight second fraction).

Definitions

As used herein, the numbering scheme for the Periodic Table Groups is the notation as set out in CHEMICAL AND ENGINEERING NEWS, 63(5), 27 (1985). Therefore, a "group 4 metal" is an element from group 4 of the Periodic Table, e.g., Zr, Ti, and Hf.

References are made herein to metallocene catalysts. The ordinarily skilled artisan will recognize that a metallocene catalyst composition is typically activated prior to its use in polymerization, so as to put the metallocene catalyst into its ionic form that reacts with the monomers to produce polymers. Such an activated catalyst may be referred to as an "activated catalyst" or the catalyst may otherwise be referred to as "activated." However, the ordinarily skilled artisan will readily be able to determine the state of the metallocene catalyst (i.e., activated or still in un-activated, or precursor, form) from the context of the discussion; therefore, a metallocene catalyst is not always necessarily referred to as "activated" or "pre-activated," but instead may simply be referenced as a metallocene catalyst, or simply as a "catalyst." For instance, a catalyst fed to and/or disposed in a polymerization reaction zone to effect polymerization can readily be assumed to be in the activated form (with or without a charge balancing moiety resulting from activation) unless specifically noted otherwise; on the other hand, a metallocene catalyst composition described as being contacted with an activator or a catalyst activator can readily be assumed to be in the un-activated or precursor form (i.e., having anionic ligands bonded to the transition metal). Likewise, although catalyst composition structures may be described herein in their un-activated form, it will be readily apparent that the active form is also intended to be included in such description; and vice-versa. The activated form will be readily apparent to the skilled artisan upon review of the un-activated or precursor form, and vice-versa.

A "dual catalyst system" or "dual metallocene catalyst system," as used herein, references a reaction or other process utilizing two different catalysts, or two different metallocene catalysts, respectively. Likewise, a "dual catalyst polymerization" or "dual catalyst metallocene polymerization" references a process in which polymerization of one or more types of monomers takes place in the presence of two different catalysts, e.g., two different metallocene catalysts.

A "polymerization reaction zone" includes any space in which the polymerization of monomers may take place. Particular examples include a polymerization reactor or a set of multiple polymerization reactors connected in series or operating in parallel, which may be in accordance with any known polymerization reactor (e.g., a continuous stirred tank reactor, a solution reactor, fluidized bed, or the like). In preferred embodiments, a polymerization reaction zone comprises a single polymerization reactor.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. A transition metal compound may be neutral as in a precatalyst, or a charged species with a counter ion as in an activated catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn (Mw/Mn). Unless otherwise noted, all molecular weight units (e.g., Mw, Mn, Mz) are g/mol. An "alkyl" group is a linear, branched, or cyclic radical of carbon and hydrogen. In a preferred embodiment, "alkyl" refers to linear alkyls.

As used herein, a "copolymer" refers to any polymeric compound formed from, and/or containing units derived from, two or more monomeric units. Copolymers include "terpolymers," which are a more specific case of polymeric compound formed from and/or containing units derived from three monomeric units.

Dual Catalyst Polymerizations

Processes according to various embodiments include polymerizing a plurality of monomers in the presence of a first metallocene catalyst and a second metallocene catalyst different from the first, preferably in the same polymerization reaction zone. The first metallocene catalyst is capable of producing high-Mooney polymer compositions (i.e., longer or higher molecular weight chains); the second produces relatively lower-Mooney polymer compositions (i.e., shorter or lower molecular weight chains) having a portion of vinyl terminated chains. Used together, the catalysts may (i) produce a bimodal polymer composition (the high-Mooney fraction produced by the first metallocene catalyst; the low-Mooney fraction produced by the second metallocene catalyst), wherein (ii) the high-Mooney fraction exhibits rheology consistent with long-chain-branching. Without wishing to be bound by theory, it is believed that the rheology of the high-Mooney fraction is due at least in part to the second catalyst's production of vinyl-terminated polymer chains, which are incorporated into the growing high-molecular weight polymer chains by the first catalyst, thereby resulting in long chain branches in such high-molecular weight polymer chains.

First Metallocene Catalyst

The first metallocene catalyst, as noted, is capable of producing high-Mooney (i.e., high-molecular weight) polymers, and it is in particular capable of incorporating vinyl-terminated polymer chains into the high-Mooney polymers it produces. Suitable catalyst compounds are described as "HMP catalysts" in Paragraphs [0076]-[0109] of International Patent Application No. PCT/US15/67582, entitled "System and Process for Producing Polymer Compositions" and filed 28 Dec. 2015, which description is hereby incorporated by reference. As set forth therein, such catalysts include bridged fluorenyl-cyclopentadienyl group 4 complexes (and/or Cp-fluorenyl variants), mono-Cp amido group 4 complexes (and/or mono-Cp amido variants), biphenyl phenol (BPP) transition metal complexes, pyridyl amide transition metal complexes and/or pyridyl diamide transition metal complexes.

Particularly preferred first metallocene catalysts according to some embodiments include fluorenyl-cyclopentadienyl group 4 complexes having the general formula (I)

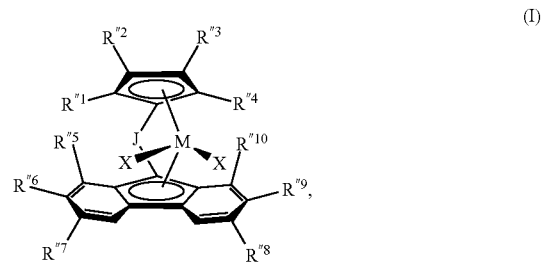

(I)

where: (1) J is a divalent bridging group (preferably comprising C, Si, or both); (2) M is a group 4 transition metal (with Hf being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ substituted or unsubstituted alkyl (preferably unsubstituted $C_1$-$C_{10}$ alkyl, more preferably $C_1$-$C_5$ alkyl), provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure. In some embodiments J is a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, $SiMePh$, $Ph_2C$, $(p\text{-}(Et)_3SiPh)_2C$, $Si(CH_2)_3$, $Si(CH_2)_3$, $Si(CH_2)_4$, and $Si(CH_2)_5$, where Me is methyl, Et is ethyl, and Ph is phenyl.

It will be understood by the ordinarily skilled artisan that by reference to compounds having structure in accordance with formula (I), both the activated and un-activated (precursor) forms of the compound are contemplated.

In certain embodiments, (1) $R'''^6$ and $R'''^9$ are each $C_1$ to $C_4$ alkyl, preferably $C_4$ alkyl such as tert-butyl; (2) $R'''^1$-$R'''^4$, $R'''^5$, $R'''^7$, $R'''^8$, and $R'''^{10}$ are each independently methyl, ethyl, or H (preferably, each is H); (3) J is selected from any of the groups just noted above (preferably J is (p-$(Et)_3$SiPh)$_2$C); (4) M is Hf; and (5) each X is independently $C_1$-$C_3$ alkyl or a halide (preferably each X is methyl).

A particularly preferred first metallocene catalyst according to some embodiments comprises 1,1'-bis(4-triethylsilylphenyl)methylene-(cyclopentadienyl)(2,7-di-tertiary-butyl-fluoren-9-yl)hafnium dimethyl.

In other embodiments, the first metallocene catalyst may comprise a mono-Cp amido group 4 complex, such as those in accordance with the description at Paragraphs [0079]-[0085] of International Patent Application No. PCT/US15/67582, which description is herein incorporated by reference.

In yet other embodiments, the first metallocene catalyst may comprise a chelated transition metal complex (type 1) as described in Paragraphs [0093]-[0098] of International Patent Application No. PCT/US15/67582, which description is herein incorporated by reference. These include in particular biphenyl phenol transition metal complexes, such as those in accordance with the description in Paragraphs [0094]-[0098] of International Patent Application No. PCT/US15/67582, which description is herein incorporated by reference. For further description of such compounds, see also WO2003/091262, WO2005/108406, US 2006/0025548, US 2006/0052554, WO2007/136494, WO2007/136496, WO2007/136495, WO2009/064482, and WO2013/096573, each of which is incorporated by reference herein.

In some further embodiments, the first metallocene catalyst comprises chelated transition metal complexes (type 2) including pyridyl amide transition metal complexes, as described in Paragraphs [0099]-[00101] of International Patent Application No. PCT/US15/67582, which description is herein incorporated by reference. For further description of such compounds, see also WO2010/0227990, US 2004/0220050, WO2004/026925, WO2004/024740, WO2004/024739, WO2003/040201, and WO2002/046249, WO2002/038628, which are incorporated by reference herein.

In yet further embodiments, suitable first metallocene catalysts include chelated transition metal complexes (type 3), e.g., pyridyl diamide transition metal complexes, such as those described in Paragraphs [0102]-[0109] of International Patent Application No. PCT/US15/67582, which description is herein incorporated by reference. For further description of such compounds, see also US 2014/0316089, WO2012/134614, WO2012/134615, WO2012/134613, US 2012/0071616, US 2011/0301310, and US 2010/0022726, each of which is incorporated by reference herein.

Second Metallocene Catalyst

The second metallocene catalyst of some embodiments, as noted, produces relatively lower-Mooney polymer compositions (i.e., shorter chain or lower molecular weight polymers), at least a portion of which have vinyl-terminated chains suitable for incorporation into the polymer chains formed by the first metallocene catalyst. Suitable second metallocene catalyst compounds include those described as "VTP catalysts" in Paragraphs [0061]-[0065] of International Patent Application No. PCT/US15/67582, which description is herein incorporated by reference. As set forth therein, particularly useful second metallocene catalysts include group 4 transition metal metallocene catalyst compounds having two indenyl ligands (i.e., bis-indenyl transition metal complexes). Particularly useful second metallocene catalyst compounds include one or more of the metallocene compounds listed and described in Paragraph [0074] of PCT/US15/67582, which description is herein incorporated by reference, and/or in Paragraphs [0089]-[0090] of U.S. Ser. No. 14/325,449, filed Jul. 8, 2014, published Jan. 22, 2015 as US 2015/0025209, which is incorporated by reference herein.

In some embodiments, the second metallocene catalyst has structure in accordance with Formula (II)

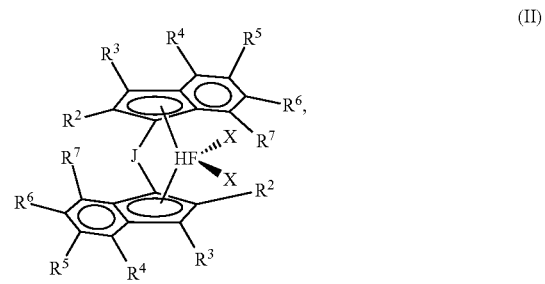

where: (1) J is a divalent bridging group comprising C, Si, or both; (2) M is a group 4 transition metal (preferably Hf); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$, $R^3$, $R^4$, $R^5$, $R^6$, and $R^7$ is independently hydrogen, $C_1$-$C_{50}$ substituted or unsubstituted alkyl (preferably H or unsubstituted $C_1$-$C_{10}$ alkyl, more preferably H or $C_1$-$C_5$ alkyl), provided that any one or more of the pairs $R^4$ and $R^5$, $R^5$ and $R^6$, and $R^6$ and $R^7$ may optionally be bonded together to form a saturated or partially saturated cyclic or fused ring structure. Such compounds are also referred to as bis-indenyl metallocene compounds.

It will be understood by the ordinarily skilled artisan that by reference to compounds having structure in accordance with formula (II), both the activated and un-activated (precursor) forms of the compound are contemplated.

In certain embodiments, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

J may be represented by the formula (IIa):

wherein J' is C or Si (preferably Si), x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In some embodiments, J may be represented by the formula $(R^a_2 J')_n$ where each J' is independently C or Si (again, with J' preferably Si), n is 1 or 2 (preferably n is 1), and each $R^a$ is, independently, $C_1$ to $C_{20}$ substituted or unsubstituted hydrocarbyl, provided that two or to more $R^a$ optionally may be joined together to form a saturated or partially saturated or aromatic cyclic or fused ring structure that incorporates at least one J'. Particular examples of J groups include dimethylsilylene, diethylsilylene, and the like.

In particular embodiments, the second metallocene catalyst has structure in accordance with Formula II, and: (1) each $R^4$ and $R^7$ is independently $C_1$-$C_5$ alkyl, preferably $C_1$ to $C_3$ alkyl (and more preferably both are methyl); (2) each $R^2$ is H or $C_1$-$C_5$ alkyl, preferably $C_1$ or H, more preferably H; (3) $R^3$, $R^5$, and $R^6$ is each independently H or $C_1$-$C_5$ alkyl, preferably $C_1$ or H, more preferably $C_1$; (4) J is cyclopentamethylenesilylene, cyclotetramethylenesilylene, cyclotrimethylenesilylene, cyclopropandiyl, cyclobutandiyl, cyclopentandiyl, or cyclohexandiyl; (5) M is Hf; and (6) each X is independently a halide or $C_1$-$C_3$ alkyl, preferably methyl.

In particular embodiments, for instance, the second metallocene catalyst comprises one or both of: (1) cyclotetramethylenesilylene-bis(2,4,7-trimethylinden-1-yl)hafnium dimethyl; and (2) cyclotetramethylenesilylene-bis(4,7-dimethylinden-1-yl)hafnium dimethyl.

The second metallocene catalyst compounds can be in rac or meso form. In one particular embodiment, the second metallocene catalyst compound is in the rac form. For instance, at least 90 wt % of the catalyst compound may be in the rac form, based upon the weight of the rac and meso forms present. More particularly, at least any one of about 92, 93, 94, 95, 96, 97, 98, and 99 wt % of the catalyst compound may be in rac form. In one embodiment, all of the catalyst compound is in rac form.

The second metallocene catalyst compounds described herein may be synthesized in any suitable manner, including in accordance with procedures described in Paragraphs [0096] and [00247]-[00298] of U.S. Ser. No. 14/325,449, filed Jul. 8, 2014, and published Jan. 22, 2015 as US 2015/0025209, and which is incorporated by reference herein.

Catalyst Activators

The terms "cocatalyst" and "activator" are used herein interchangeably and are defined to be any compound which can activate any one of the catalyst compounds described above (including either or both of the first and second metallocene catalyst compounds) by converting the neutral catalyst compound to a catalytically active catalyst compound cation. Suitable activators are described in Paragraphs [0110]-[0115] of International Patent Application No. PCT/US15/67582, which description is herein incorporated by reference; and/or in Paragraphs [0110]-[0133] of US 2015/0025209, which description is incorporated by reference herein.

Particularly useful activators in some embodiments include non-coordinating anion (NCA) activators, such as those in Paragraph [0124] of US 2015/0025209, and also those in Columns 7 and 20-21 in U.S. Pat. No. 8,658,556, which description is incorporated by reference. Particular examples of suitable NCA activators include: N,N-dimethylanilinium tetrakis(pentafluorophenyl)borate, N,N-dimethylanilinium tetrakis(perfluoronaphthyl)borate, N,N-dimethylanilinium tetrakis (perfluorobiphenyl)borate, triphenylcarbenium tetrakis(perfluoronaphthyl)borate, bis($C_4$-$C_{20}$alkyl)methylammonium tetrakis (perfluoronaphthyl)borate, $Me_3NH$ tetrakis(pentafluorophenyl)borate, $Me_3NH$ tetrakis(heptafluoro-2-naphthyl)borate, and bis(hydrogenated tallowalkyl)methylammonium tetrakis(pentafluorophenyl)borate.

The first and second metallocene catalysts may be activated by the same or by different activators. They may be activated together (when the same activator is used) or separately. In a particular embodiment, they are activated by the same activator either together or separately, preferably separately. Both catalysts can also be activated on-line in the catalyst feed line or in the polymerization reactor.

Further, the typical activator-to-catalyst molar ratio for each of the first and second metallocene catalysts is 1:1, although preferred ranges may include from 0.1:1 to 1000:1 (e.g., from 0.5:1 to 100:1, such as 2:1 to 50:1).

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. Preferably, each catalyst is contacted with its respective activator(s) before being mixed together and/or before being fed into the polymerization reaction zone.

Optional Scavengers or Co-Activators

In addition to the activator compounds, scavengers or co-activators may be used in conjunction with the first and second metallocene catalysts in a polymerization reaction zone. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Suitable α-olefin Monomers

As noted, the polymerization processes described herein utilize one or more olefin monomers as input to the dual catalyst polymerization. The monomers preferably comprise two or more α-olefins (so as to produce a copolymer composition), and more preferably comprise ethylene and one or more additional α-olefins (so as to produce an ethylene copolymer composition, and in particular an ethylene-α-olefin copolymer composition). Most preferred are polymerizations employing ethylene and propylene so as to produce ethylene-propylene copolymer compositions (i.e., copolymer compositions consisting of ethylene and propylene-derived units, or copolymer compositions consisting essentially of ethylene and propylene-derived units, meaning that other monomer-derived units are present at less than 0.001 wt %), although certain embodiments more generally comprise polymerizing ethylene and one or more $C_3$-$C_{20}$, preferably $C_3$ to $C_{12}$, α-olefins, most preferably ethylene and one other $C_3$-$C_{12}$ α-olefin.

Controlling Dual Catalyst Polymerizations

As noted, polymerization processes of various embodiments include polymerization in the presence of both the first and second metallocene catalysts in a polymerization reaction zone (such reaction zone preferably being a single polymerization reactor).

The processes of various embodiments herein include operating the polymerization (e.g., controlling and/or utilizing polymerization conditions, and/or contacting monomers with catalysts) so as to obtain an ethylene copolymer composition having (1) a first ethylene copolymer fraction having high molecular weight, exhibiting branched rheology, and having relatively lower ethylene content (based on the weight of the first ethylene copolymer fraction); and (2) a second ethylene copolymer fraction having low molecular weight, exhibiting linear rheology, and having relatively higher ethylene content (based on the weight of the second ethylene copolymer fraction). According to certain of these embodiments, the first metallocene catalyst produces the first fraction, while the second metallocene catalyst produces the second fraction. More specifically, the second catalyst produces linear, low-molecular weight polymer chains with relatively higher ethylene content, and some of which have vinyl chain terminations. Thus, a portion of these linear low-molecular weight polymer chains are themselves capable of being incorporated into the higher molecular weight chains by the first metallocene catalyst, thereby producing the higher molecular weight first fraction having to branched structure (e.g., comb-branched structure). The ordinarily skilled artisan with the benefit of this disclosure will readily perceive how to control polymerization reaction conditions so as to obtain a desired molecular weight of the first fraction, and of the second fraction (e.g., by operating the polymerization process to increase or decrease the activity of the first and second catalysts, respectively). Moreover, the relative amount of each fraction (i.e., the proportion of the first and second fraction in the copolymer composition) may be controlled by controlling the relative activity of the first and second metallocene catalysts. In particular embodiments, this includes controlling the molar ratio of the first metallocene catalyst to the second metallocene catalyst.

Methods for such control are known, and include controlling polymerization reaction temperature and controlling feed rate of chain transfer agents (e.g., hydrogen) to the polymerization reaction zone, as well as controlling monomer (e.g., ethylene and/or propylene) concentration in the reaction zone. For instance, molecular weight (i.e., polymer chain length) control can be achieved through control of the reactor temperature (e.g., by adjusting the feed temperature of the monomers and solvent). Lowering the reactor temperature will generally lead to higher molecular weight (longer polymer chain length) while higher operating temperature may increase the catalyst activity and/or permit higher polymer concentrations in the reactor and achieve higher productivity (although higher catalyst activity typically means lower molecular weight or shorter polymer chains). However, the temperature should not exceed the polymerization decomposition temperature or the temperature at which the catalyst(s) can sustain the polymerization reactions.

Monomer concentration in the polymerization reaction zone can be controlled by one or more of monomer feed rate, catalyst feed rate, and residence time (particularly in continuous reaction processes). Higher molecular weight in each fraction can be achieved under higher monomer concentration. On the other hand, increasing catalyst feed rate may result in increased conversion but lower monomer concentration in the polymerization reaction zone, and therefore lower molecular weight.

Chain transfer agents such as hydrogen can be utilized to supplement control of molecular weight (e.g., hydrogen flow to the reaction zone is increased to lower the molecular weight).

The general method for controlling polymer properties used for single catalyst polymerization applies to the dual catalyst processes of various embodiments of the current invention. For polymerization with dual catalysts of the current invention, the Mooney viscosity is also determined by the amount (and molecular weight) of each polymer component derived from each respective catalyst (e.g., the first and second metallocene catalysts of various embodiments). Creation of the long chain branched molecular structure on the high molecular weight side (e.g., the polymers produced via the first metallocene catalyst) adds another element for control. MWD and degree of branching can be manipulated through change of the catalyst ratio. In the system of the current invention, with other process variables held constant, the overall polymer composition molecular weight increases with increasing fraction of the first (high molecular weight-producing) metallocene catalyst, up to a certain peak point. That is, as catalyst ratio (mol:mol) of the first to the second metallocene catalyst increases, the amount of branched high-molecular weight fraction (and therefore molecular weight of the overall copolymer composition) increases up to a point. The molecular weight then decreases with increasing the fraction of the first metallocene catalyst. It is theorized that this eventual decrease of copolymer composition molecular weight past a certain catalyst ratio (mol:mol) of first to second metallocene catalyst is due to fewer vinyl-terminated polymer chains being produced by the second metallocene catalyst (present at lower fraction), and therefore a reduction of vinyl-terminated polymer chains being incorporated by the first metallocene, thus lowering the overall polymer molecular weight (and further leading to relatively less branched rheology in the high-molecular weight first fraction).

Accordingly, the polymerization methods of various embodiments herein also include operating the polymerization (e.g., controlling and/or utilizing polymerization conditions) so as to obtain polymer compositions having desired amounts of the (1) high molecular weight, low ethylene content, preferably non-linear (e.g., long chain branched) first fraction and the (2) low molecular weight, high ethylene content, linear second fraction.

In preferred embodiments, operating the polymerization so as to obtain the desired first and second fractions (and in the desired amounts) is based at least in part upon the molar ratio of first to second metallocene catalyst in the polymerization reaction zone. As used herein with respect to batch or semi-batch reactions in which the first and second metallocene catalysts are provided in a non-continuous manner to the polymerization reaction zone, a molar ratio may refer to the relative amounts (in moles) of each of the first and second metallocene catalyst provided to the polymerization reaction zone. With respect to continuous reaction processes in which catalysts are fed continuously to the polymerization reaction zone, molar ratio refers to the relative feed rates (mol/hr, mol/min, mol/s or the like) of the first and second metallocene catalysts.

Without wishing to be bound by theory, it is believed that the combination of first and second metallocene catalysts according to various embodiments herein provides for the advantageous careful tuning of the relative amounts and rheology properties of the respective polymer fractions of the copolymer compositions of such embodiments.

However, the relationship between catalyst ratio and produced polymer properties is complicated by the synergistic effects between the first and second metallocene catalysts. In particular, as previously noted, it is believed that the high-polymer molecular weight fraction is that the first metallocene catalyst produces will have a long-chain-branched (and in particular, comb-branched) architecture, owing at least in part to the first catalyst's ability to incorporate vinyl-terminated chains (produced by the second metallocene catalyst) into the high-molecular weight polymer produced by the first metallocene catalyst. Such structure may be indicated by, e.g., the branching index g' of the high-polymer molecular weight fraction and/or the branching index g' of the copolymer composition. Therefore, the first metallocene catalyst's production of a greater amount of high-molecular weight polymer not only pushes the resulting polymer composition's molecular weight higher; it also tends to make the polymer composition exhibit rheology properties more and more indicative of long-chain branching (owing to the greater amount of branched high-molecular weight polymer produced). However, the formation of long chain branched architecture is a competitive process between monomer propagation and incorporation of the vinyl-terminated macromonomers (e.g., as produced by the second metallocene catalyst) in the same polymer chain in the same given polymerization environment. For this forcing effect on rheology to occur, there must also be an adequate amount of production of vinyl-terminated chains from the second metallocene catalyst. So, higher catalyst ratios (i.e., relatively more of the first metallocene) do not necessarily mean greater degree of long-chain branching.

Care must therefore be taken in determining particular catalyst ratios (at given other polymerization conditions for producing copolymer compositions of given polymer molecular weight) that balance both (i) the copolymer composition's distribution of high- and low-Mooney fractions (produced by the first and second catalyst, respectively); and (ii) degree of branching and fraction of the branched architectures. In some particular embodiments, it is preferred to use conventional means for controlling polymer molecular weight (e.g., temperature, monomer concentration, and/or chain transfer agent feed rates) rather than utilizing catalyst ratios for that purpose; and, within the control parameters for obtaining the desired polymer molecular weight, and polymer composition rheology (as indicated by, e.g., branching index, phase angle, or the like) by controlling the reaction based at least in part upon catalyst ratios.

More generally, processes according to yet other embodiments include contacting the monomers with the first and second metallocene catalysts so as to obtain a copolymer composition having the desired properties (and, in particular, the desired rheology, desired polymer molecular weight, and/or desired ethylene content in each fraction and/or in the overall copolymer composition).

Producing Bi-Modal Ethylene Copolymer Compositions

Accordingly, dual catalyst polymerization processes of particular embodiments include contacting ethylene and one or more additional $C_3$-$C_{20}$ (preferably $C_3$-$C_{12}$) α-olefins with the first and second metallocene catalysts (and optionally, further including controlling the polymerization reaction) so as to obtain a bimodal ethylene copolymer composition comprising (1) a first ethylene copolymer fraction having high molecular weight, exhibiting branching topology, and having relatively lower ethylene content (based on the weight of the first ethylene copolymer fraction); and (2) a second ethylene copolymer fraction having low molecular weight, exhibiting linear rheology, and having relatively higher ethylene content (based on the weight of the second ethylene copolymer fraction) as compared to the ethylene content of the first ethylene copolymer fraction (based on the weight of the first ethylene copolymer fraction).

The first ethylene copolymer fraction preferably has ethylene content of less than or equal to 60 wt %, preferably within the range from 40 to 60 wt %, more preferably within the range from 50 to 59 wt %, said wt % s based on the content of monomer-derived units in the first ethylene copolymer fraction. In various embodiments, ranges from any of the foregoing low ends to any of the foregoing high ends are also contemplated. The remainder of the first ethylene copolymer fraction is composed of units derived from one or more $C_3$-$C_{12}$ α-olefins; preferably the remainder of the first ethylene copolymer fraction consists of propylene-derived units.

Also or instead, the first ethylene copolymer fraction may have weight average molecular weight (Mw) within the range from 80,000 g/mol to 1,000,000 g/mol, preferably within the range from 90,000 to 900,000 g/mol, such as 100,000 to 750,000 g/mol, 100,000 to 600,000 g/mol, or even 100,000 to 500,000 g/mol, with ranges from any of the foregoing low ends to any of the foregoing high ends also contemplated in various embodiments. The first ethylene copolymer fraction may have number average molecular weight (Mn) of at least 70,000, or at least 100,000, such as 70,000 to 500,000 or 100,000 to 500,000 g/mol (again with ranges from any of the foregoing low ends to any of the foregoing high ends also contemplated in various embodiments).

Further, the first ethylene copolymer fraction may have branching index g' of less than or equal to 0.95, such as within the range from 0.4 to 0.95, or 0.5 to 0.95, or 0.6 to 0.95.

The second ethylene copolymer fraction preferably has ethylene content that is greater than or equal to the first copolymer fraction's ethylene content plus 3 wt %, preferably plus 5 wt %. Put in mathematical terms, if the first copolymer fraction's ethylene content is characterized as $C2_{first}$ (in wt % based on the monomer-derived content of the first copolymer fraction), then the second copolymer fraction's ethylene content $C2_{second}$ (in wt % based on the monomer-derived content of the second copolymer fraction) is preferably greater than or equal to $(C2_{first}+3)$ wt %, more preferably greater than or equal to $(C2_{first}+5)$ wt %. In some embodiments, the second copolymer fraction's ethylene content may be within the range from $C2_{first}+3$ wt % on the low end, to $C2_{first}+10$ wt % on the high end. Also or instead, the ethylene content of the second ethylene copolymer may be greater than 60 wt %, and/or within the range from 60 or 61 wt % to 80 wt %, preferably from 60 or 61 wt % to 70 wt %. The wt % s of the second ethylene copolymer fraction's ethylene content described in this paragraph are based on the content of monomer-derived units in the second ethylene copolymer fraction. The remainder of the second ethylene copolymer fraction is composed of units derived from one or more $C_3$-$C_{12}$ α-olefins; preferably the remainder of the second ethylene copolymer fraction consists of propylene-derived units.

Further, the molecular weight (Mw) of the second ethylene copolymer fraction may be at least 50,000 g/mol less than the molecular weight (Mw) of the first ethylene copolymer fraction. For instance, in some embodiments, Mw of the second ethylene copolymer fraction may be within the range from 15,000 g/mol to 500,000 g/mol, preferably from 15,000 g/mol to 400,000 g/mol, such as 20,000 g/mol to 300,000 g/mol, or even 20,000 g/mol to 200,000 g/mol, such as 20,000 g/mol to 100,000 g/mol, with ranges from any of the foregoing low ends to any of the foregoing high ends also contemplated in various embodiments (e.g., from 15,000 g/mol to 100,000 g/mol). In some embodiments, Mn of the second ethylene copolymer fraction may be within the range from 5,000 g/mol to 100,000 g/mol, such as 10,000 to 50,000 g/mol.

Also or instead, the second ethylene copolymer fraction may have branching index g' indicating linear structure. For instance, the second ethylene copolymer fraction may have g' of 1, or within the range from 0.96 to 1, such as 0.98 to 1, or 0.99 to 1, with ranges from any one of the foregoing low ends to any one of the foregoing high ends also contemplated in various embodiments.

The ethylene copolymer composition of some embodiments may comprise the first ethylene copolymer fraction in an amount within the range from 50 to 97 wt %, such as within the range from 51 to 95 wt %, 60 to 95 wt %, 70 to 93 wt %, or 75 to 90 wt %, with ranges from any of the foregoing low ends to any of the foregoing high ends also contemplated in various embodiments. All such wt % s are based upon the combined weight of the first and the second ethylene copolymer fractions. The second ethylene copolymer fraction may constitute the balance of the ethylene copolymer composition in such embodiments. In certain embodiments, more generally, the copolymer composition comprises more of the first ethylene copolymer fraction than the second copolymer fraction.

In yet further embodiments, the ethylene copolymer composition (comprising first and second ethylene copolymer fractions) may instead be characterized based upon the overall copolymer composition's properties. Alternatively, the ethylene copolymer compositions of some embodiments may exhibit both (1) the above-recited properties of the respective first and second ethylene copolymer fractions and (2) the following properties of the overall ethylene copolymer composition.

In particular, the ethylene copolymer composition may have one or more of:
  Ethylene content (wt %, based on monomer-derived content of the ethylene copolymer composition) within the range from 40 to 70 wt %, preferably within the range from 50 to 65 wt %, such as 50 to 60 wt %, with ranges from any one of the foregoing low ends to any one of the foregoing high ends also contemplated in various embodiments. In preferred embodiments, the balance of the ethylene copolymer composition consists or consists essentially of units derived from a $C_3$-$C_{12}$ α-olefin, preferably propylene;
  Weight-average molecular weight (Mw) within the range from 100,000 g/mol to 500,000 g/mol, preferably within the range from 100,000 to 400,000 g/mol, such as 110,000 to 250,000 g/mol, with ranges from any one of the foregoing low ends to any one of the foregoing high ends also contemplated in various embodiments;
  Number-average molecular weight (Mn) within the range from 20,000 g/mol to 100,000 g/mol, preferably within the range from 25,000 g/mol to 90,000 g/mol, such as 30,000 g/mol to 80,000 g/mol, with ranges from any one of the foregoing low ends to any one of the foregoing high ends also contemplated in various embodiments;
  Molecular weight distribution (MWD), a.k.a. polydispersity index (PDI), defined as Mw/Mn, within the range from 2 to 10, preferably from 2.5 to 9, such as 3 to 8, with ranges from any one of the foregoing low ends to any one of the foregoing high ends also contemplated in various embodiments;
  branching index g' of less than or equal to 0.97, preferably less than or equal to 0.96, such as less than or equal to 0.95, such as within the range from 0.4 to 0.97 or 0.5 to 9.96, or 0.6 to 0.95, with ranges from any one of the foregoing low ends to any one of the foregoing high ends also contemplated in various embodiments; and
  optionally, in some embodiments, phase angle (δ) within the range from 15° to 25°, such as 15° to 24°, preferably 15° to 22°.

As the ordinarily skilled artisan will appreciate, the overall copolymer composition properties may provide a convenient measurement to show the bimodality of the copolymer composition, particularly where lower Mn and higher Mw (and therefore higher polydispersity or MWD) are present. Further, the overall copolymer composition long chain branching properties (e.g., branching index g' and/or phase angle δ) may conveniently indicate the presence of the long-chain-branched high molecular weight fraction, and in particular may indicate the branching topology (e.g., presence of comb-branching in the high molecular weight fraction).

In yet further embodiments, such ethylene copolymer compositions may be characterized generally as comprising first and second ethylene copolymer fractions, wherein the first ethylene copolymer fraction has (i) higher Mw, (ii) lower ethylene-derived content, and (iii) lower g' than the second ethylene copolymer fraction.

Polymerization processes of such embodiments (e.g., to obtain a copolymer composition in accordance with any of the foregoing embodiments) may include copolymerizing ethylene and one or more α-olefins (preferably propylene) in the presence of the above-described first and second metallocene catalysts in a single polymerization reaction zone. Such embodiments preferably employ the first and second metallocene catalysts in a catalyst ratio (moles first metallocene catalyst:moles second metallocene catalyst) within the range from 0.5:1 to 5:1, preferably from 1:1 to 4:1, such as 1.5:1 to 3.5:1, with ranges from any one of the foregoing low ends to any one of the foregoing high ends also contemplated in various embodiments.

Processes according to yet other embodiments may include series polymerization; for instance, ethylene and another $C_3$-$C_{12}$ α-olefin (preferably propylene) may be polymerized in the presence of a second metallocene catalyst in a first polymerization reaction zone to obtain a first polymerization effluent, which is then passed to a second polymerization reaction zone (to which additional ethylene and/or additional $C_3$-$C_{12}$ α-olefin are also optionally fed) and copolymerized in the presence of the first metallocene catalyst (with unreacted ethylene and/or $C_3$-$C_{12}$ α-olefin monomer from the first polymerization and/or additional ethylene and/or $C_3$-$C_{12}$ α-olefin monomer fed to the second polymerization reaction zone).

Preferred polymerization reactor temperatures in the various polymerization process embodiments may range from 50° C. to 300° C., but preferably are within the range from 90° C. to 200° C., such as 100° C. to 180° C. or 100° C. to 150° C. Reactor pressures may range from 100 to 2000 psig, 250 to 1500 psig, such as 350 to 1000 psig, or 400 to 800 psig. And, chain transfer agent may be fed to any one polymerization reaction zone (e.g., in continuous polymerization processes) at a concentration (within the feed) of up to 2 wt %, but preferably within a range of 20 to 500 wppm, such wt % based on total mass of the monomers, solvent, and catalyst fed to a polymerization reaction zone. A preferred chain transfer agent is hydrogen ($H_2$), however other chain transfer agents may also or instead be used (e.g., vinyl chloride, vinyl fluoride, vinyl bromide, aluminum alkyls, and/or deuterium, among others).

Use of Ethylene Copolymer Compositions as Viscosity Modifiers

Ethylene copolymer compositions in accordance with various embodiments above may advantageously be employed as viscosity modifier compositions in some embodiments. Without wishing to be bound by theory, bimodal ethylene copolymer compositions exhibiting one or more of the desired properties previously described (and/or in which the first and second ethylene copolymer fractions exhibit the properties previously described) may provide significant advantages as viscosity modifiers. Copolymerizing α-olefin monomers with a vinyl-terminated polyolefin may lead to the development of a comb-branched polyolefin (e.g., the first ethylene copolymer fraction of various embodiments). Long chain branches from combs do not shrink the polymer solution coil as severely as the long chain branches from stars. Additionally, obtaining a bimodal copolymer composition in which the low molecular-weight fraction (e.g., the second ethylene copolymer fraction of various embodiments) is substantially linear, but of higher ethylene content than the high-molecular weight fraction provides additional advantages. Such low-molecular weight fraction may raise thickening efficiency when the copolymer composition is used as a viscosity modifier (e.g., because ethylene swells the most, and has the highest thickening efficiency, in hydrocarbon solvents or lubricant basestocks among all poly-α-olefins). At the same time, the high-molecular weight fraction (e.g., the first ethylene copolymer fraction of various embodiments), being comb-branched rather than star-branched, may deliver shear thinning and fuel economy.

Additionally, since long chain branches shrink the polymer chain's coils, it is preferred that the long chain branches are present only on the high molecular-weight molecules (since they have bigger coils to start out with), which is also consistent with the copolymer compositions described herein. This mixture of linear (low molecular weight) fraction and branched (high molecular weight) fraction would lower shear thinning onset shear rate, and deliver gentle shear-thinning slope (as a result of the shear thinning onset shear rate differences between the linear and branched molecules) and, at the same time, deliver both thickening efficiency and fuel economy.

Accordingly, a copolymer composition (e.g., an ethylene copolymer composition) in accordance with any of the above-described embodiments can be blended with one or more base oils (or basestocks), for instance such that the resulting blended composition comprises from 0.1 to 10 wt %, such as 0.5 to 5 wt %, of the ethylene copolymer composition. The basestock can be or include natural or synthetic oils of lubricating viscosity, whether derived from hydrocracking, hydrogenation, other refining processes, unrefined processes, or re-refined processes. The basestock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the basestock is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the basestock can be defined as specified in the American Petroleum Institute (API) Base Oil Interchangeability Guidelines. For example, the basestock can be or include an API Group I, II, III, IV, V oil or mixtures thereof.

In one or more embodiments, the basestock can include oil or compositions thereof conventionally employed as crankcase lubricating oils. For example, suitable basestocks can include crankcase lubricating oils for spark-ignited and compression-ignited internal combustion engines, such as automobile and truck engines, marine and railroad diesel engines, and the like. Suitable basestocks can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable basestocks can also be or include gear lubricants, industrial oils, pump oils and other lubricating oils.

In one or more embodiments, the basestock can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oil basestocks such as alkyl esters of dicarboxylic acids, polyglycols and alcohols; polyalpha-olefins; polybutenes; alkyl benzenes; organic esters of phosphoric acids; polysilicone oils; etc. The lubricating oil composition can also be utilized in a concentrate form, such as from 1 wt % to 49 wt % in oil, e.g., mineral lubricating oil, for ease of handling, and may be prepared in this form by carrying out the reaction of the invention in oil as previously described.

Optionally, one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like can be blended into the basestocks.

The pelletized, solid polymer compositions of the present invention, as described above, can be added by blending directly with the base oil so as to give directly the viscosity for the VI improver, so that the complex multi-step process of the prior art is not needed. The solid polymer composition can be dissolved in the basestock without the need for additional shearing and degradation processes.

Test Methods

Small Amplitude Oscillatory Shear (SAOS); Phase Angle (otherwise known as loss angle) δ or delta; Shear Thinning Ratio; Shear Thinning Index (STI); Relaxation Time τ; Large Amplitude Oscillatory Shear (LAOS); Mooney Large Viscosity (ML); Mooney Large Relaxation Area (MLRA); corrected MLRA (cMLRA); molecular weights (number average Mn, weight average Mw, and z-average Mz); and composition distribution are determined in accordance with the following description.

Small Amplitude Oscillatory Shear (SAOS): Dynamic shear melt rheological data was measured using the ATD® 1000 Rubber Process Analyzer from Alpha Technologies. A sample of approximately 4.5 gm weight is mounted between the parallel plates of the ATD® 1000. The test temperature is 125° C., the applied strain is 14% and the frequency was varied from 0.1 rad/s to 200 rad/s. The complex modulus (G*), complex viscosity (η*) and the phase angle (δ) are measured at each frequency.

A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ (or delta) with respect to the strain wave. The stress leads the strain by δ (or delta). The phase angle δ, is the inverse tangent of the ratio of G" (shear loss modulus) to G' (shear storage modulus). For a typical linear polymer, the phase angle approaches 90° at low frequencies (or long times), since the polymer chains can relax quickly in the melt, absorbing energy and making G" much larger than G'. With increasing frequency, the relaxation process is not fast, the polymer chains cannot absorb all the energy imparted in the shear oscillation, with the result the storage modulus G' increases relative to G". Eventually at the cross-over point, G' equals G" and the phase angle is 45°. At much higher frequencies (or short times), G' dominates the response over G", the phase angle approaches 0°, which is indicative of the plateau region. In contrast to linear polymers, branched polymer chains relax very slowly and cannot absorb the energy that is imparted even at very low frequencies, as a result the phase angle never approaches 90° at low frequency. In general, the phase angle at a specified frequency will be much lower for a branched polymer relative to a linear polymer. Similarly, the tan($\delta$) will be lower for a branched polymer as compared to that of a linear polymer.

Van Gurp Palmen: The plot of the phase angle ($\delta$) versus the complex modulus (G*) is known as the Van Gurp Palmen plot (M. Van Gurp, J. Palmen, Rheol. Bull., 67, pp 5-8, 1998). The phase angle is calculated at a G* of $10^5$ Pa for each polymer being analyzed. The plot of $\delta$ versus log (G*) was fitted to a third degree polynomial using the Least Squares method ($R^2 > 0.95$), and the polynomial equation was used to calculate $\delta$ at the specified G* value (e.g., $10^5$ Pa). The phase angle will decrease with higher degree of branching or increased polydispersity (molecular weight distribution, or MWD).

Shear Thinning Ratio: Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 128 rad/sec.

Shear Thinning Index: Another method of quantifying shear-thinning is to use a parameter called the shear-thinning index (STI), defined as:

$$STI = ((\eta_{0.1\ rad/s} - \eta_{128\ rad/s})/\eta_{0.1\ rad/s}),$$

where $\eta_{0.1\ rad/s}$ and $\eta_{128\ rad/s}$ are the complex shear viscosity at a frequency of 0.1 rad/s and 128 rad/s, respectively. The shear-thinning index typically increases with branching level; thus it is believed that for highly branched polymers (and/or polymer compositions that behave like highly branched polymers), the parameter STI approaches 1 since $\eta_{0.1\ rad/s} >> \eta_{128\ rad/s}$. Conversely for Newtonian fluids, where the viscosity is independent of shear rate, STI approaches 0.

Relaxation Time: Relaxation time $\tau$ may help indicate polydispersity/MWD and/or the presence long-chain branching in a polymer composition (or behavior of a polymer composition in a manner that emulates long-chain branched polymers). Relaxation time $\tau$ may be determined from the Cross Equation as used to model viscosity data collected over a range of frequencies. The viscosity data collected over a range of frequency can be fitted (e.g., via the least squares method) using the general form of the Cross Equation (J. M Dealy and K. F Wissbrun, Melt Rheology and Its Role in Plastics Processing Theory and Applications; Van Nostrand Reinhold: New York, p. 162 (1990):

$$\eta = \eta_\infty + (\eta_0 - \eta_\infty)/(1 + (\dot{\gamma}\tau)^{1-n}),$$

where $\eta$ is the dynamic viscosity, $\eta_0$ is the limiting zero shear viscosity, $\eta_\infty$ the infinite shear viscosity, $\tau$ the relaxation time at the given frequency $\eta$, n the power law exponent describes the extent of shear thinning. For Newtonian fluid, n=1 and the dynamic complex viscosity is independent of frequency. For polymer of interest here, n<1, so that the enhanced shear thinning behavior is indicated by a decrease in n (increase in 1−n), and $\dot{\gamma}$ is the input shear frequency. The term $\eta_\infty$ from the curve fit, with the result the expression reduces to three parameters:

$$\eta = \eta_0/[1 + (\dot{\gamma}\tau)^{1-n}],$$

This expression gives the relaxation time when testing is conducted at constant strain and constant temperature (as noted above for SAOS measurements). As noted, the relaxation time, $\tau$ in the Cross Model can be associated to the polydispersity and/or long-chain branching in the polymer. For increased levels of branching (and/or polymer compositions emulating increased levels of branching), it is expected that $\tau$ would be higher compared to a linear polymer of the same molecular weight.

Large Amplitude Oscillatory Shear (LAOS): The rheological properties of polymer compositions are studied using a rubber process analyzer (RPA) using a method according to the following description. Large Amplitude Oscillatory Shear (LAOS) can provide useful non-linear characteristics of polymers. LAOS can be described as the oscillatory strain domain where the shear complex modulus (G*) is a function of both the angular frequency and strain as compared with SAOS. LAOS tests are conducted using the ATD® 1000 rubber process analyzer commercialized by Alpha Technologies. The ATD® 1000 is a dynamic mechanical rheological tester designed for testing unfilled elastomers and compounds. Except where otherwise noted, Rheological tests using large amplitude oscillatory shear were carried out at a temperature of 125° C., strain amplitude of 1000% and frequency of 0.63 rad/sec. The input strain is represented by the function: $\gamma = \gamma_0 \sin(\omega t)$, where $\gamma_0$ is the strain amplitude. As can be seen, the function has a time dependence. The stress response of the polymer sample is measured using the following Fourier series, which is a function of time, angular frequency, and strain amplitude as shown below.

$$\sigma(t; \omega; \gamma_0) = \gamma_0 \sum_n \{G'(\omega, \gamma_0) \sin n\omega t + G''(\omega, \gamma_0) \cos n\omega t\},$$

G' and G" correspond to the real and imaginary components of the complex modulus, G*. Put another way, G' corresponds to the shear storage modulus (Pa), and G" to the shear loss modulus (Pa). The odd harmonics of this Fourier series ($G_1'$, $G_3'$, $G_5'$, etc.) are calculated by the RPA.

The long-chain branching (LCB) index is calculated according to the method described in Florian J. Stadlera, Adrien Leyguea, Henri Burhin, Christian Baillya, Polymer Reprints, 2008, 49(1) 121-122 (see also H. G. Burhin, N. Rossion, C. Bailly, A. Leygue, R. Kuenings, in FT Rheology and Large Amplitude Oscillatory Shear (LAOS), an interesting tool to study polymer architecture, International Rubber Conference IRC 2006, Lyon, France (2006); A. Leygue, N. Roisson, C. Bailly, R. Keunings, in Study of reversing flows of linear entangled polymers through constitutive models, AERC, Hersonisos, Crete, Greece (2006); and Burhin et. al., in XVth International Congress on Rheology, Monterey, Calif. (August 2008)). In particular, the following expressions are used:

$$LCB \text{ index} = \frac{G_1'}{G_5'} - E_3,$$

$$E_3 = \frac{5}{4} + \frac{1}{4}\left(\frac{G_3'}{G_5'}\right)^2 - \frac{1}{2}\frac{G_3'}{G_5'},$$

where, $G_1'$, $G_3'$, and $G_5'$ are the first, third and fifth harmonic associated with the real component G' of the complex modulus (G*). Higher LCB index typically indicates increased polymer branching.

Mooney viscosity (ML and MST): "Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D-1646, but with the following modifications/clarifications of that procedure. First, sample polymer is pressed between two hot plates of a compression press prior to testing. The plate temperature is 150° C.+1-10° C. instead of the 50+/−5° C. recommended in ASTM D-1646, because 50° C. is insufficient to cause sufficient massing. Further, although ASTM D-1646 allows for several options for die protection, should any two options provide conflicting results, PET 36 micron should be used as the die protection. Further, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+1-3° C. for 30 min in air; ML as reported herein were determined after resting at 24+/−3° C. for 30 min in air. The results are reported as Mooney Units (ML, 1+4 @ 125° C.), where M is the Mooney viscosity number, L denotes large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

The torque limit of the Mooney viscometer is about 100 Mooney units (MU). Mooney values greater than about 100 Mooney units generally cannot be measured under these conditions. In this event, a non-standard rotor design is employed with a change in Mooney scale that allows the same instrumentation on the Mooney viscometer to be used for more viscous polymers. This rotor is both smaller in diameter and thinner than the standard ML rotor, and thus it is termed MST (Mooney Small-Thin). MST methods may be used to determine viscosity of polymers having viscosity greater than 100 Mooney units as described in Col. 5, lines 15-52 of U.S. Pat. No. 9,006,332, which description is incorporated herein by reference. In particular, MST may be determined and reported as (MST, 5+4 @ 200° C.), meaning a 5 minute pre-heat and 4-minute torque recording at 200° C. is used with the MST rotor. Further, if Mooney viscosity is reported herein as MU, MST, then it should be assumed unless otherwise noted that the just-described method for determining MST viscosity is used.

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

Molecular Weight and Composition Distribution by GPC-3D: Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B LS columns for separation using a flow rate of 0.54 ml/min and a nominal injection volume of 300 microliter. The detectors and columns were contained in an oven maintained at 145° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference. This GPC SEC-DRI-LS-VIS method may also be referred to by the shorthand "GPC-3D."

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, DRI, using the following equation:

$$C = K_{DRI} I_{DRI}/(dn/dc),$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers. The value (dn/dc) is otherwise taken as 0.1 for other polymers and copolymers. Units of parameters used throughout this description of the SEC method are: concentration is expressed in g/cm³, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c,$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015-0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn. And, although MWD (polydispersity) is taken as Mw/Mn, where DRI and LS measurements conflict, MWD should be determined as Mw (measured by LS)/Mn (measured by DRI), or $Mw_{LS}$/$Mn_{DRI}$.

Branching Index (g' or $g'_{vis}$): A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2,$$

where c is concentration and was determined from the DRI output.

The branching index (g'vis) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'_{vis} = \frac{[\eta]_{avg}}{kM_v^\alpha},$$

the intrinsic viscosity of the linear polymer of equal molecular weight and same composition is calculated using Mark-Houwink equation, where the k and a are determined based on the composition of linear ethylene/propylene copolymer using a standard calibration procedure. For purpose of the embodiments described herein and claims thereto, k=0.000579 and α=0.695 for ethylene polymers, and k=0.0002288 and α=0.705 for propylene polymers. For EP, the values of k and α are determined based on the ethylene/propylene composition using a standard calibration procedure such that: k=(1−0.0048601EP−6.8989×10⁻⁶EP²)× 5.79×10⁻⁴(200000)$^{-Trunc(0.1EP)/1000}$ and α=0.695+Trunc (0.1EP)/1000, where EP is the weight percent of propylene in the EP, and Trunc indicates that only the integer portion is kept in the calculation. For example, Trunc(5.3)=5. $M_v$ is the viscosity-average molecular weight based on molecular weights determined by LS analysis. See Macromolecules, 2001, 34, pp. 6812-6820 and Macromolecules, 2005, 38, pp. 7181-7183, regarding selecting a linear standard having similar molecular weight and comonomer content, and determining k coefficients and α exponents. As used herein, the shorthand g' should be considered equivalent to the term $g'_{vis}$ unless specifically stated otherwise.

Molecular weight distribution and Composition Distribution by GPC-IR (GPC-4D): Where indicated, GPC-IR (sometimes also referred to as GPC-4D) may instead be used to determine the distribution and the moments of molecular weight (e.g., Mn, Mw, Mz, etc.) and/or the comonomer distribution (C2, C3, C6, etc.). According to the GPC-IR procedure, distribution and moments of molecular weight and/or comonomer distribution are determined with a high temperature Gel Permeation Chromatography (Polymer-Char GPC-IR) equipped with a multiple-channel band filter based infrared (IR) detector ensemble IR5, in which a broad-band channel is used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 micrometer Teflon filter and degassed with an online degasser before entering the GPC instrument. The nominal flow rate is 1.0 mL/min and the nominal injection volume is 200 microliter. The whole system including transfer lines, columns, detectors are contained in an oven maintained at 145° C. Given amount of polymer sample is weighed and sealed in a standard vial with 10 microliter flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at 22° C. and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I,$$

where α is the mass constant determined with PE standard NBS1475. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of mono-dispersed polystyrene (PS) standards. The molecular weight is calculated at each elution volume with following equation:

$$\log M_X = \frac{\log(K_X/K_{PS})}{a_X + 1} + \frac{a_{PS} + 1}{a_X + 1} \log M_{PS},$$

where K and α are the coefficients in the Mark-Houwink equation. The variables with subscript "X" stand for the test sample while those with subscript "PS" stand for polystyrene. In this method, $a_{PS}=0.67$ and $K_{PS}=0.000175$ while $a_X$ and $K_X$ are determined based on the composition of linear ethylene/propylene copolymer using a standard calibration procedure. See T. Sun, P. Brant, R. R. Chance, and W. W. Graessley, "Effect of Short Chain Branching on the Coil Dimensions of Polyolefins in Dilute Solution," Macromolecules, Volume 34, Number 19, pp. 6812-6820, (2001). The comonomer composition is determined by the ratio of the IR detector intensity corresponding to $CH_2$ and $CH_3$ channel calibrated with a series of PE and PP homo/copolymer standards whose nominal value are predetermined by NMR. For purposes of the present application, the same k and a values for ethylene, propylene, and ethylene-propylene polymers as described above in connection with GPC-3D procedures should also be used in this equation.

Either GPC-SEC (GPC-3D) or GPC-IR (GPC-4D) may be used to determine molecular weights, molecular weight distributions, and/or composition distributions, as specified in context herein. Where neither method is specified, or where results of the two methods conflict, it is preferred to use the GPC-SEC (GPC-3D) method detailed above.

13C NMR Measurements: Chemical shift assignments for the ethylene-propylene copolymer are described by Randall in "A Review Of High Resolution Liquid $^{13}$Carbon Nuclear Magnetic Resonance Characterization of Ethylene-Based Polymers," Polymer Reviews, 29:2,201-317 (1989). The copolymer content (mole and weight %) is also calculated based on the method established by Randall in this paper. Calculations for $r_1 r_2$ were based on the equation $r_1 r_2 = 4*$ [EE]*[PP]/[EP]$^2$; where [EE], [EP], [PP] are the diad molar concentrations; E is ethylene, P is propylene.

The values for the methylene sequence distribution and number average sequence lengths were determined based on the method established by James C. Randall, "Methylene sequence distributions and average sequence lengths in ethylene-propylene copolymers," Macromolecules, 1978, 11, 33-36.

Ethylene Content: Ethylene content is determined using FTIR according the ASTM D3900.

EXAMPLES

Example 1

Polymerizations of ethylene and propylene were carried out using a solution process in a 28 liter continuous stirred-tank reactor (autoclave reactor). The autoclave reactor was equipped with a stirrer, a water-cooling/steam-heating element with a temperature controller, and pressure controller. Isohexane was used as a solvent. It was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to the manifold. A 3 wt % mixture of tri-n-octylaluminum (TNOAL) in isohexane was also added to the manifold through a separate line (used as a scavenger) and the combined mixture of monomers and solvent was fed into the reactor using a single tube.

Catalyst solution included Catalyst A (1,1'-bis(4-triethylsilylphenyl)methylene-(cyclopentadienyl)(2,7-di-tertiary-butyl-fluoren-9-yl)hafnium dimethyl) (in accordance with the first metallocene catalyst of various embodiments) and, where indicated in Table 1 below, Catalyst B (rac-cyclotetramethylenesilylene-bis(2,4,7-trimethylinden-1-yl)hafnium dimethyl) (in accordance with the second metallocene catalyst of various embodiments). Each of Catalyst A and catalyst B solution was separately prepared in a 4 L Erlenmeyer flask in a nitrogen-filled glove box. Each flask was charged with 1 L of air-free anhydrous toluene. For Catalyst A, the flask was then charged with 2 g (2.1 mmol) of Catalyst A, with 1.7 g of Activator A1 (which was N,N-dimethylanilinium tetrakis(pentafluorophenyl)borate), and finally with an additional 3 L of toluene. For Catalyst B, the flask was charged with 0.50 g (0.83 mmol) Catalyst B, then with 0.95 g (0.83 mmol) of Activator A2 (which was N,N-dimethylanilinium tetrakis(heptafluoro-2-naphthyl)borate), and finally with an additional 3 L of toluene. For each catalyst solution, after solids dissolved, with stirring, the solution was charged into an ISCO pump and metered into the reactor.

The two catalyst feed rates were controlled along with the monomer feed rates and reaction temperature, as shown in Table 1, to produce copolymers E1 and E2 with a target C2 (ethylene) content in between 55 to 60 wt %, and to produce Reference copolymer R1 (made using no catalyst B). Each reactor product stream was treated with trace amounts of methanol to halt the polymerization. The mixture was then freed from solvent via a low-pressure flash separation, treated with antioxidant, then subjected to a devolatilizing extruder process. The dried polymer was then pelletized.

Polymerization reaction conditions, and catalyst used, are set forth below in Table 1.

TABLE 1

Reaction Conditions for Example 1

| Reactor Conditions | R1 (Reference 1) | E1 | E2 |
|---|---|---|---|
| Cat B feed rate (cc/min) | 0 | 1.08 | 1.74 |
| Cat A feed rate (cc/min) | 1.46 | 1.28 | 1.15 |
| C2 feed rate (kg/hr) | 5.5 | 5.5 | 5.5 |
| C3 feed rate (kg/hr) | 7.0 | 7.0 | 7.0 |
| Isohexane feed rate (kg/hr) | 48.8 | 48.7 | 48.2 |
| Scavenger (TNOA) feed rate (kg/hr) | 0.02 | 0.02 | 0.02 |
| Feed $H_2$ (sccm) | 1.6 | 1.8 | 1.4 |
| Feed Temp (° C.) | 15.0 | 15.0 | 15.0 |
| Reaction Temperature (° C.) | 130 | 130 | 130 |
| Reaction Pressure (psig) | 1670 | 1471 | 1480 |
| Cat Ratio (molar) Cat A/Cat B | NA | 3.0 | 1.7 |
| Polymer production rate (kg/hr) | 7.0 | 7.4 | 6.8 |
| Catalyst Efficiency (Kg polymer/(total mmol cat × hr)) | 152 | 133 | 125 |
| C2 Conversion (%) | 76.3 | 76.6 | 76.6 |
| C3 Conversion (%) | 40.0 | 40.1 | 40.1 |
| Estimated C2 Content (wt %) | 55.8 | 56.4 | 57.4 |
| ML, 1 + 4 @ 100° C. | 34 | 44.7 | 47.7 |
| MLRA | 98 | 174.1 | 271.4 |
| cMLRA at 80 ML | 336 | 403 | 571 |

*g catalyst includes the weight of Catalyst A, Catalyst B, and activator

Figure 1B:
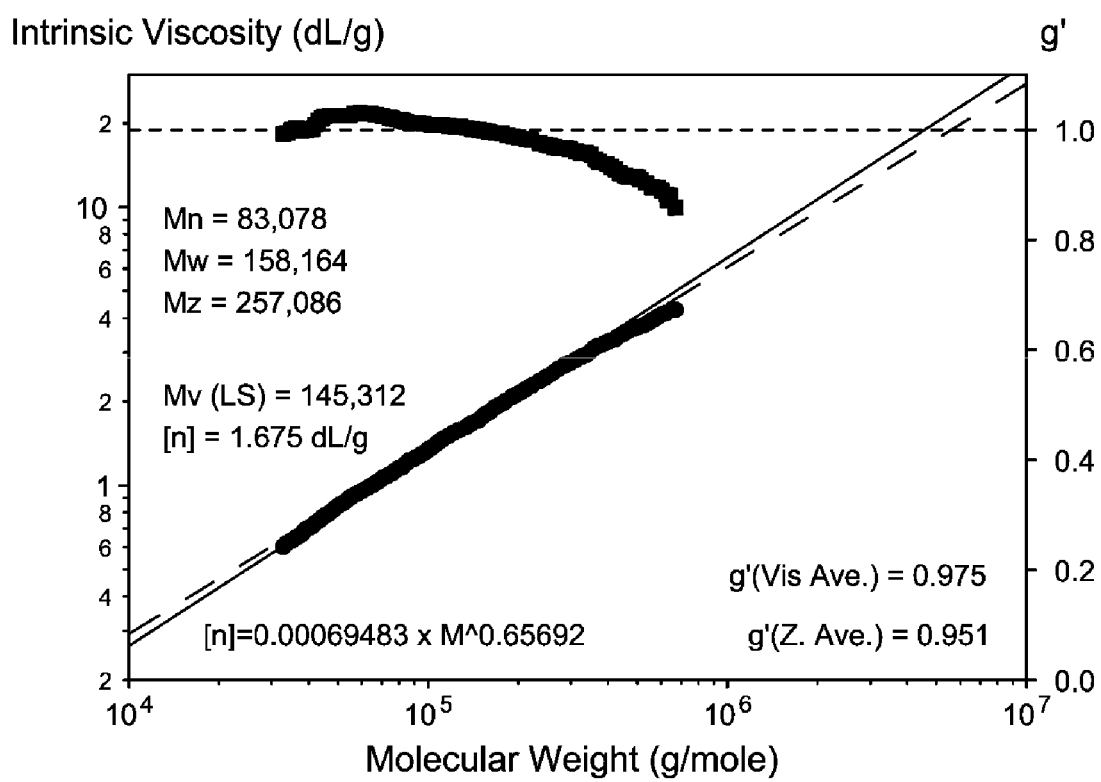
Figure 2A:
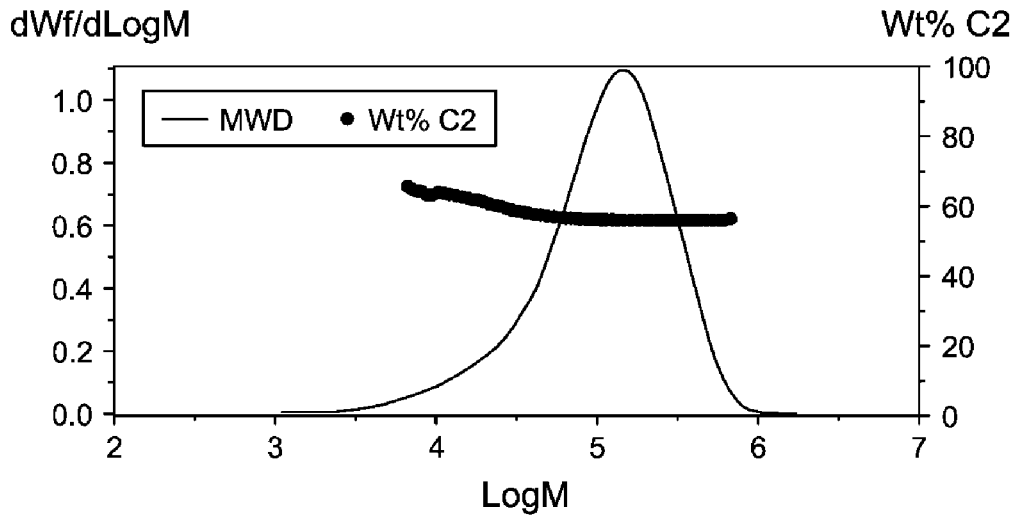
FIG. 2a and FIG. 2b are GPC-4D and GPC-3D plots, respectively, of another copolymer composition as described in Example 1, and in accordance with some embodiments of the present invention.
Figure 2B:
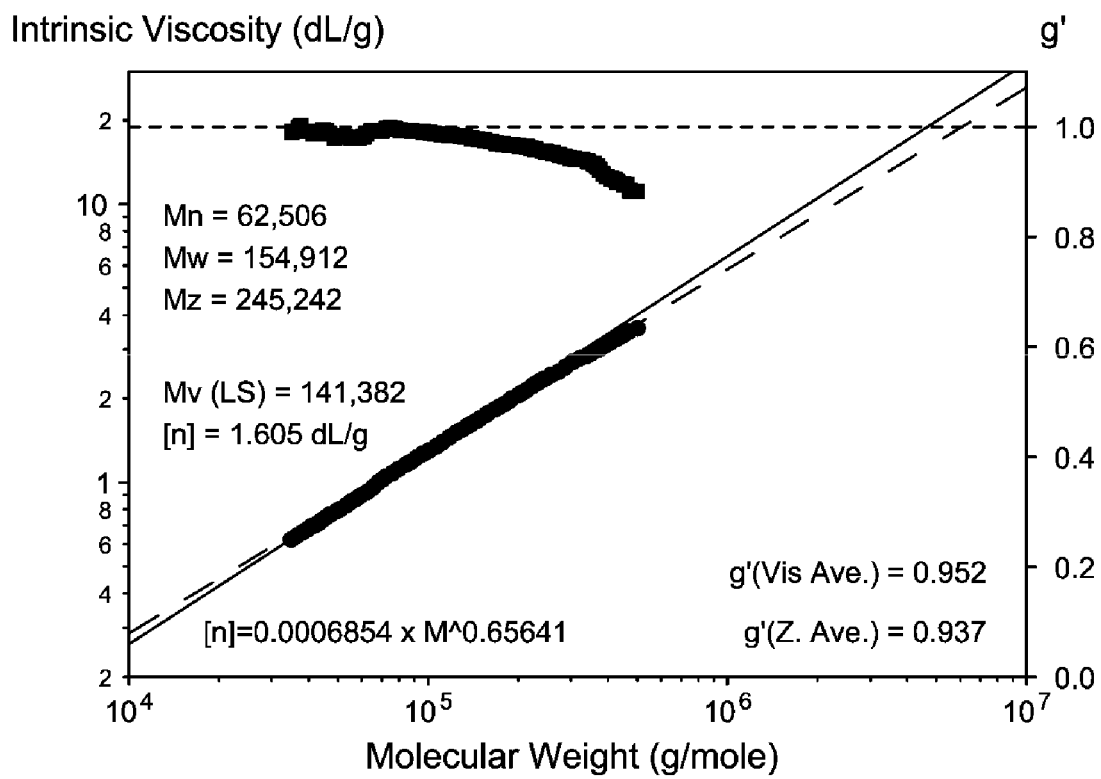
Figure 3A:
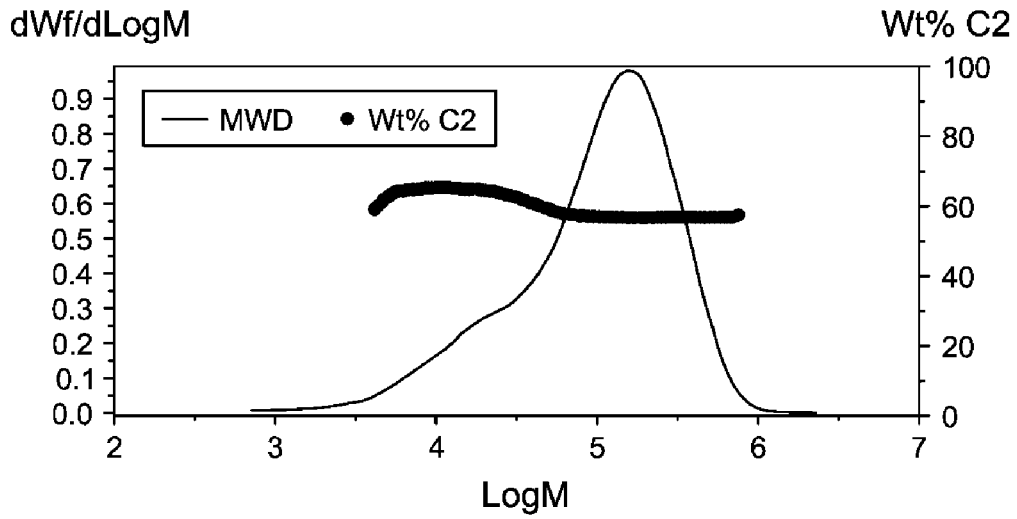
FIG. 3a and FIG. 3b are GPC-4D and GPC-3D plots, respectively, of yet another copolymer composition as described in Example 1, and in accordance with some embodiments of the present invention.
Figure 3B:
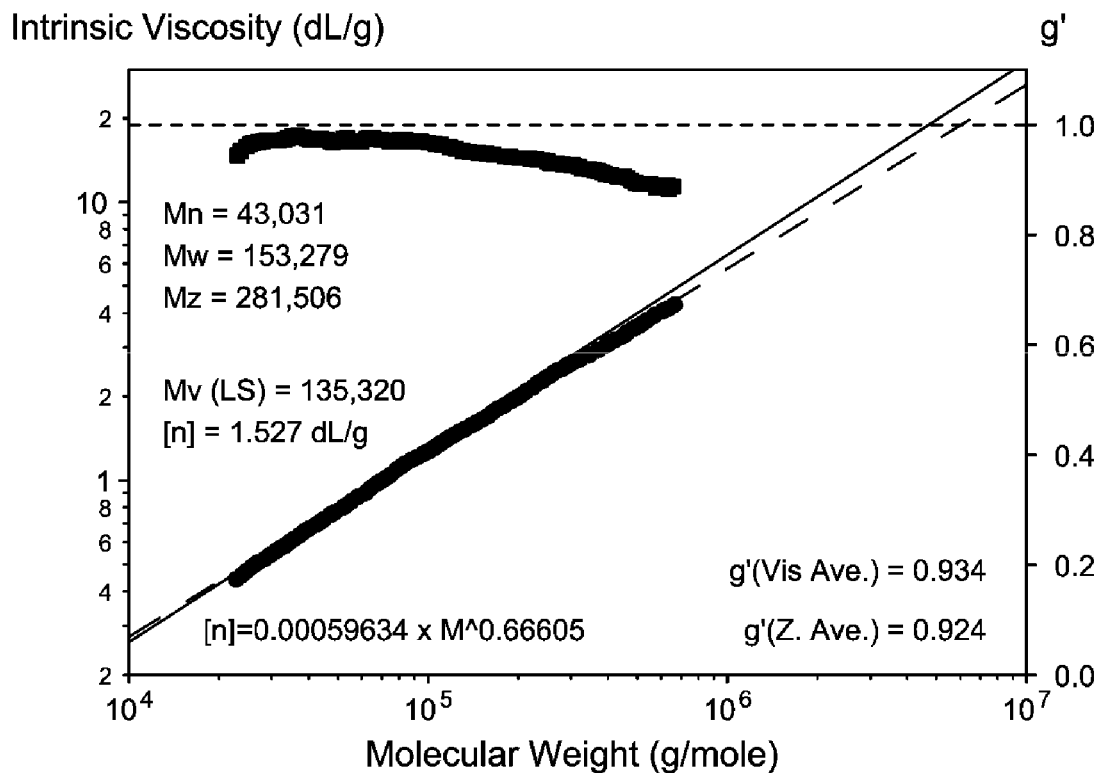

These polymer products were characterized for molecular weight and composition distributions by GPC-IR (or GPC-4D), for molecular weight and long chain branching distributions by GPC-3D, for compositions and sequence distribution by C13 NMR, for their rheological properties (used to determine the presence of long chain branching) by rheological viscosity curves (determined by SAOS (small angle oscillatory shear) followed by TT'S (time temperature superposition). Their characterization results are tabulated in Table 2 and their molecular weight, composition, and long chain branching distribution curves are shown in FIG. 1, FIG. 2, and FIG. 3.

TABLE 2

Characterization Results for Example 1

| | R1 (Reference 1) | E1 | E2 |
|---|---|---|---|
| GPC-4D | | | |
| C2 (wt %) | 56.44 | 57.39 | 58.22 |
| Mn | 74,109 | 55,749 | 38,771 |
| Mw | 154,109 | 155,462 | 154,028 |
| PDI | 2.08 | 2.79 | 3.97 |
| Bimodal | No | No | Yes |
| GPC-3D | | | |
| Mn | 70,348 | 55,753 | 34,003 |
| Mw | 165,036 | 170,864 | 153,279 |
| PDI | 2.35 | 3.06 | 4.73 |
| g' | 0.975 | 0.952 | 0.934 |
| Long Chain Branched | Some | Yes | Yes |
| Rheometer | | | |
| Viscosity (Pa, 120 C./100 1/s) | 472,928 | 540,509 | 472,405 |

TABLE 2-continued

Characterization Results for Example 1

| | R1 (Reference 1) | E1 | E2 |
|---|---|---|---|
| Phase Angle (degree) | 28.2 | 23.9 | 20.5 |
| LCB | Maybe | Yes | Yes |
| C13 NMR | | | |
| C2 (wt %) | 56.2 | 56.4 | 58.3 |
| [EEE] | 0.248 | 0.266 | 0.313 |
| Methylene sequence > 6 (Mole %) | 10.16 | 10.46 | 11.47 |

Without the addition of Catalyst B, compositions in E1 are uniform across the molecular weights with mono-modal molecular weight distribution. E1 is slightly branched. With the addition of catalyst A, as shown in FIG. 2 and FIG. 3, non-uniform composition distributions emerge as a result of the differences in reactivity toward ethylene between catalysts A and B. By lowering the Cat A to Cat B ratio in E2, bimodal molecular weight and composition distributions developed with long chain branches present only in the high molecular weight components. The peak high molecular weight in E2 is 156,000 g/mole whereas its peak low molecular weight is around 20,000 g/mole. The C2 content for the high molecular weight components in E2 is 57 wt % and the C2 content for the low molecular weight components in E2 is 65 wt %.

Example 2

Lubricant solution blending experiments were carried out using a polyalphaolefin, PAO4 (4 centipoise viscosity, 25° C.) as the base stock. R1, E1, E2, and Paratone™ 8900G, an OCP viscosity modifier which is linear with narrow molecular weight distribution, were blended in PAO4 at 0.5 wt % with the addition of antioxidants (AO) of Irganox 1076 at 0.015 wt % and Irgafos 168 at 0.005 wt %. Antioxidants are useful in preventing polymer degradation during their rheological evaluations. The density values of those lubricant solutions thus prepared are listed in Table 3.

TABLE 3

Density Values of Example 2 Lubricant Solutions

| LUBE | g/ml @ 40° C. | g/ml @ 90° C. |
|---|---|---|
| PAO4 + AO + R1 | 0.80405 | 0.77245 |
| PAO4 + AO + E1 | 0.80407 | 0.77246 |
| PAO4 + AO + E2 | 0.80404 | 0.77245 |
| PAO4 + AO + Paratone 8900G | 0.80406 | 0.77247 |

Figure 4:
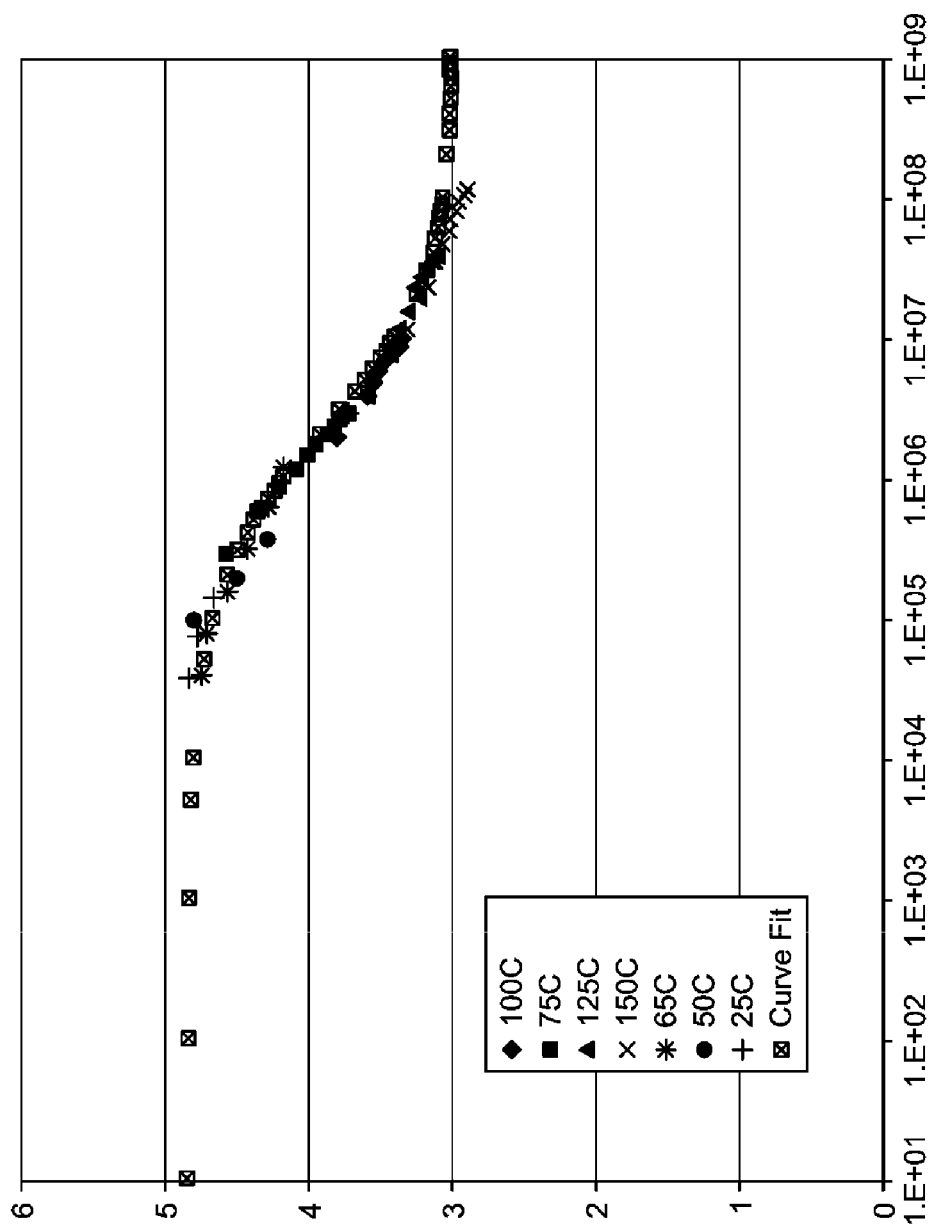
FIG. 4 is a graph showing the Time-Temperature Superposition (TTS) and Carreau-Yasuda curve fit of the viscosity curve for polyalphaolefin (PAO) containing a commercial viscosity modifier, as described in connection with Example 2.
Figure 5:
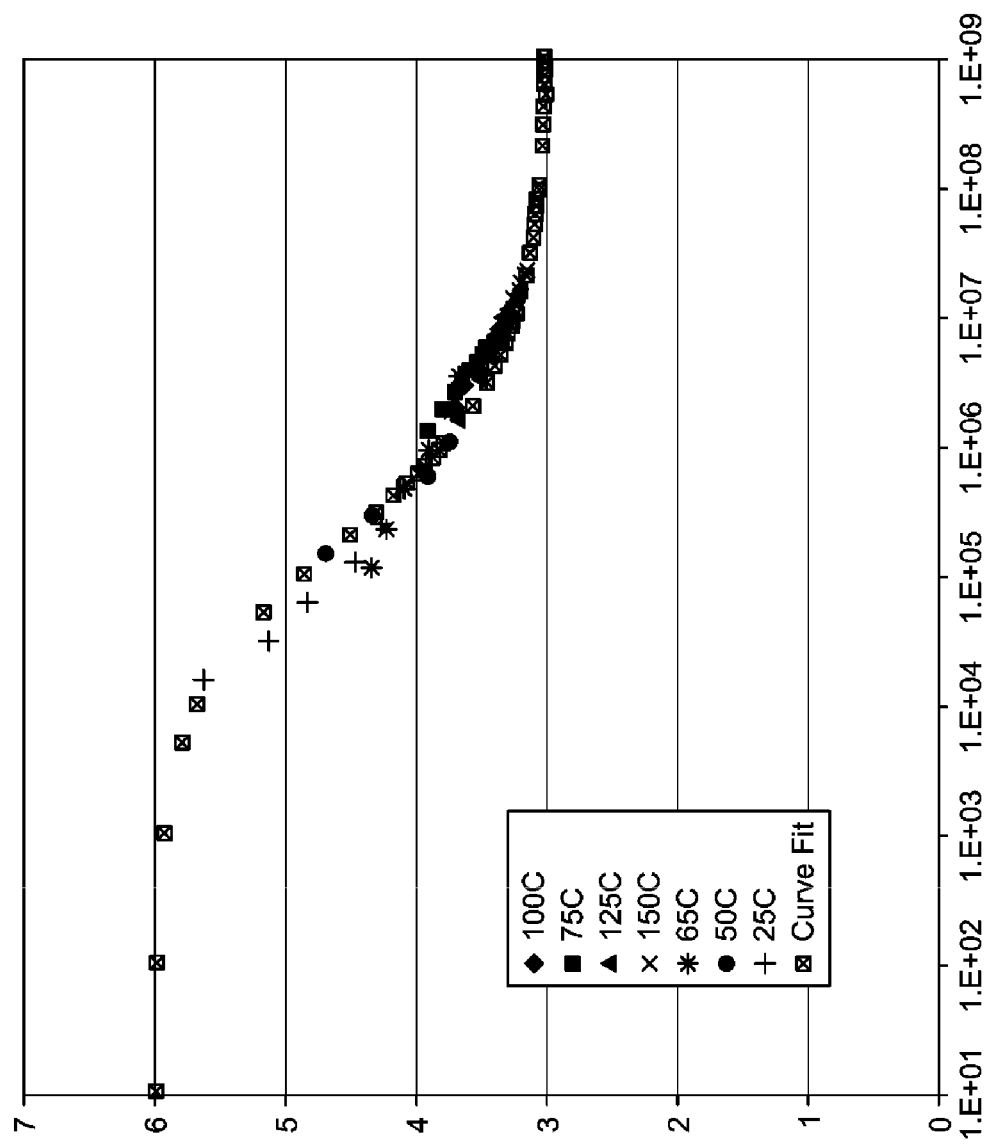
FIG. 5 is a graph showing the Time-Temperature Superposition (TTS) and Carreau-Yasuda curve fit of the viscosity curve for polyalphaolefin (PAO) containing an ethylene copolymer composition in accordance with some embodiments of the present invention, as described in connection with Example 2.

Using an ultra-high shear viscometer (shear rate range from 106 to 107 1/s) and a m-VROC micro-capillary viscometer (shear rate range from 103 to 106 1/s) operating at various temperatures, viscosity values as functions of shear rate and temperature can be obtained. Based on the principle of time-temperature correspondence, time-temperature superposition (TTS) was then applied to consolidate all measured data into one single viscosity master curve (as shown in FIG. 4 and FIG. 5 for Paratone™ 8900G and for E2, respectively) at a reference temperature of 100° C. using shift factors. Thus obtained viscosity curve can be fitted to a five-parameter non-Newtonian Carreau-Yasuda model as shown below in Equation (1).

$$\frac{\eta - \eta_\infty}{\eta_0 - \eta_\infty} = [1 + (\lambda \dot{\gamma})^a]^{(n-1)/a} \quad (1)$$

This is a pseudoplastic flow model with asymptotic viscosities at zero, $\eta_0$, and infinite, $\eta_\infty$, shear rates and with no yield stress. The parameter $1/\lambda$ is the critical shear rate at which viscosity begins to decrease, or onset of the shear thinning, and the power-law slope is (n−1) which is the shear thinning slope. The parameter "a" represents the width of the transition region between zero shear viscosity and the power-law region, or the transition from Newtonian to shear thinning. The infinite viscosity in this case is set to the base stock PAO viscosity.

Figure 6:
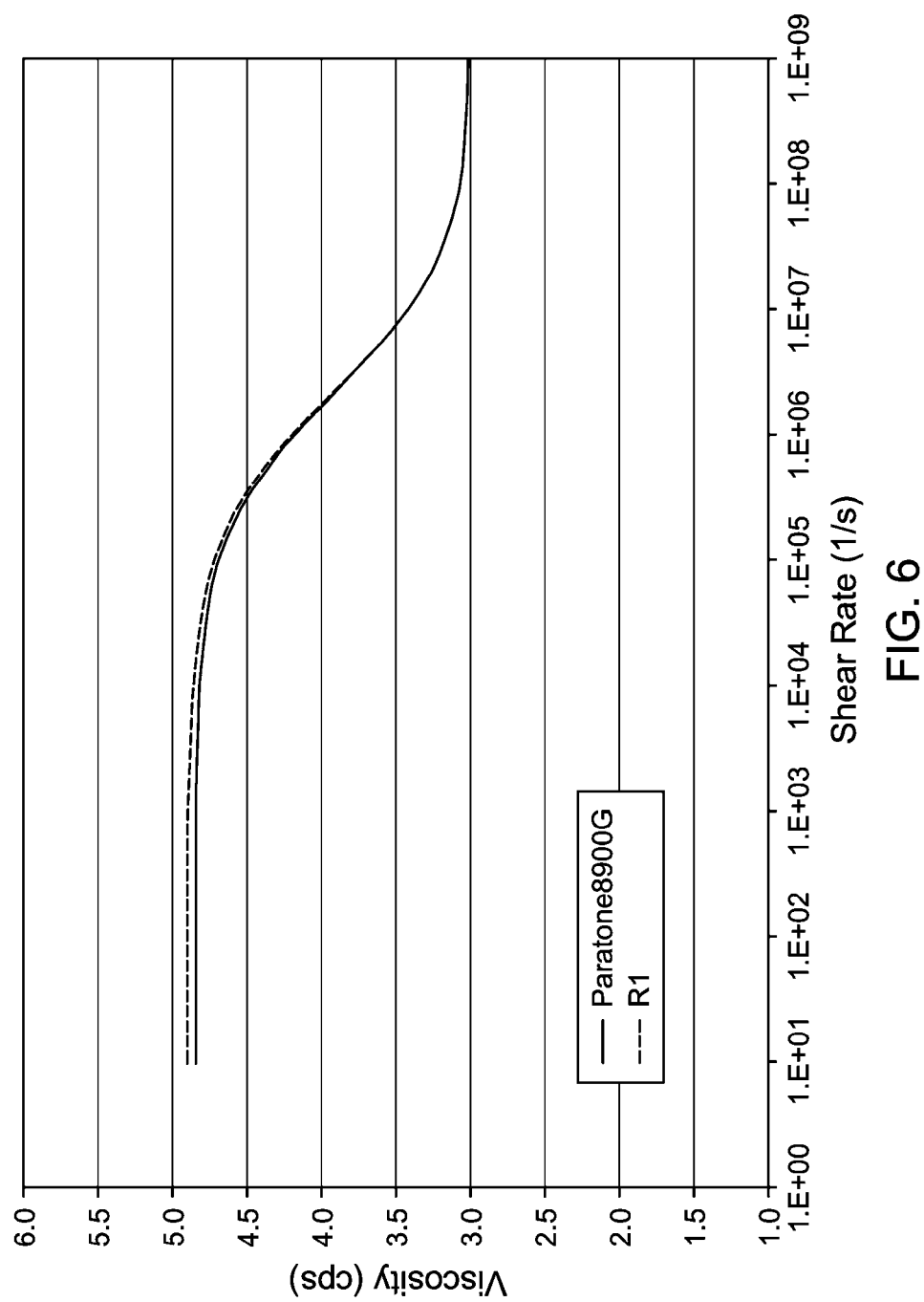
FIG. 6 is a graph showing viscosity curves (viscosity vs. shear rate) for PAOs containing certain copolymer compositions as described in connection with Example 2.
Figure 7:
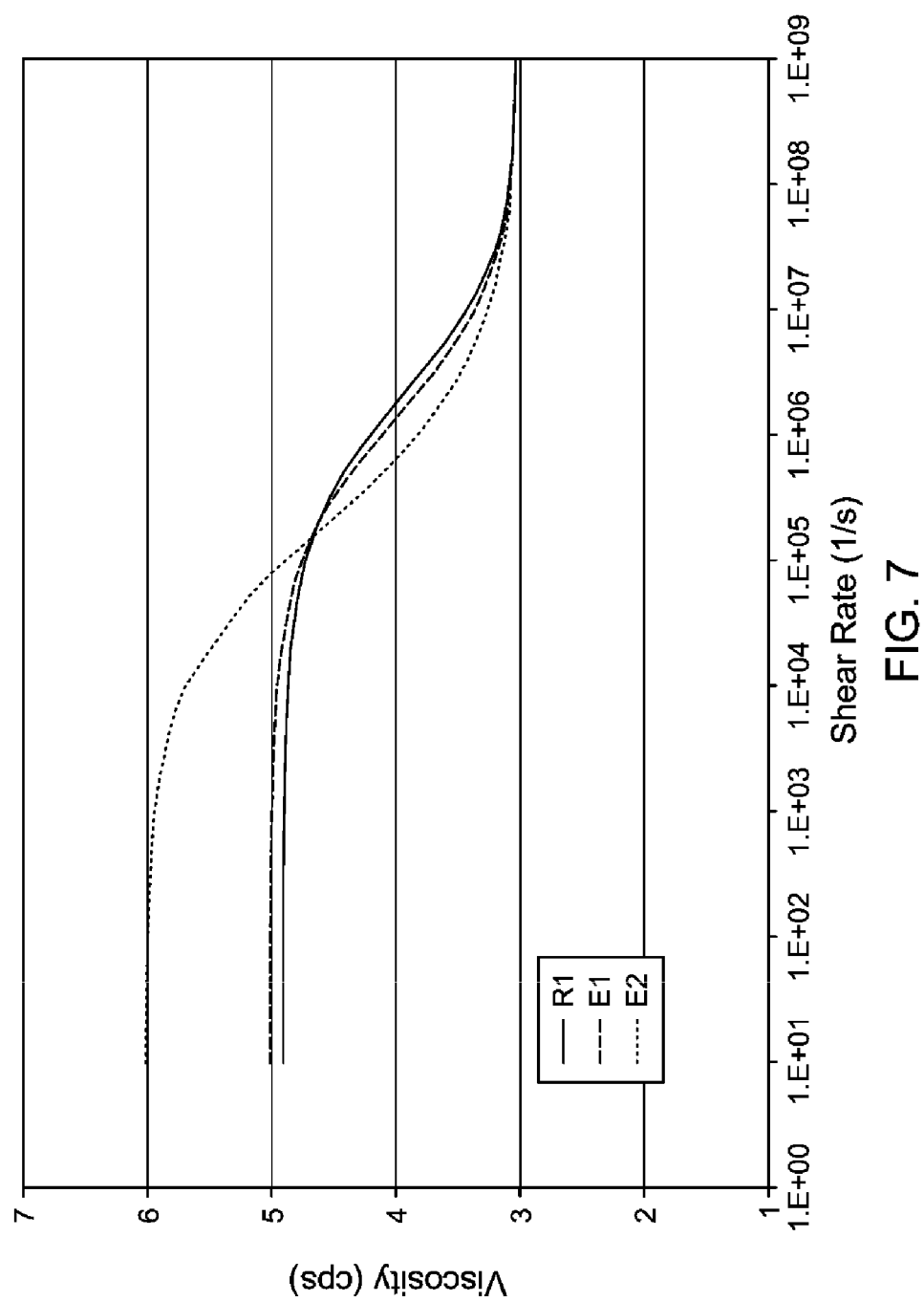
FIG. 7 is a graph showing viscosity curves (viscosity vs. shear rate) for PAOs containing certain other copolymer compositions as described in connection with Example 2.

The viscosity curves of Paratone 8900G and R1 in PAO solutions are shown in FIG. 6. As indicated, without favorable bimodality and with only a small amount of long chain branches, the viscosity curve of R1 in PAO is similar to that of the commercial linear and mono-modal MWD Paratone 8900G product in PAO. Once the composition heterogeneity and bimodality are introduced, as shown in FIG. 6, thickening efficiency (or the viscosity enhancement) is enhanced. Additionally, the shear thinning onset becomes earlier and the shear thinning slope becomes less (with broader transition). At the high shear rates, >$10^6$ l/s, PAO solution containing E2 has the lowest viscosity despite that it has the highest viscosity at low shear rates (good thickening efficiency).

For passenger vehicle and commercial vehicle lubricant applications, there is a viscous loss of the engine oil affecting the fuel economy at the steady-state running of an engine. It is generally agreed that this viscous contribution be determined by viscosity values at shear rates from $4 \times 10^5$ to $10^6$ s$^{-1}$ measured at temperatures ranging from 100 to 150° C., depending on the vehicle service. There is a specified HTHS (high-temperature high-shear-rate) minimum viscosity for each viscosity grade, measured at $10^6$ s$^{-1}$ shear rate and 150° C. The shear rate and temperature defined for HTHS viscosity measurement are reflecting the flow environment in an operating crankshaft bearing at steady state. Viscosity modifiers are added in lubricants to thicken the lubricant base stock so that a lower viscosity and higher viscosity index base stock can be used for an overall improvement in viscosity index of the resulting lubricants. In viscosity-modifier containing lubricants, shear thinning is then necessary for the lubricant solution to have lower high-shear-rate viscosity and good fuel economy. It is preferred for a polymer viscosity modifier to deliver an earlier shear thinning onset at shear rates below $10^5$ s$^{-1}$ and a gentle shear thinning slope so the viscosity loss with increasing shear rates would not be drastic and below the HTHS minimum viscosity that can lead to wear. PAO lubricant solution containing E2 can thus be expected to have excellent viscometric performance and fuel economy.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" to require the listed components without excluding the presence of any other additional components. Likewise whenever a composition, an element or a group of elements is preceded with the transitional phrase "comprising", it is understood that we also contemplate the same composition or group of elements further narrowed with more restrictive transitional phrases such as "consisting essentially of", "consisting of", "selected from the group of consisting of", or "is" preceding the recitation of the composition, element, or elements and vice versa.

The invention claimed is:

1. A bimodal ethylene copolymer composition comprising:
   (a) a first ethylene copolymer fraction comprising units derived from ethylene and one or more $C_3$-$C_{12}$ α-olefins, and having (i) ethylene-derived content ($C2_{first}$) within the range from 40 wt % to 60 wt %, based on the content of monomer-derived units in the first ethylene copolymer fraction; (ii) weight average molecular weight (Mw) within the range from 100,000 to 750,000 g/mol; and (iii) branching index g' of less than or equal to 0.95; and
   (b) a second ethylene copolymer fraction having units derived from ethylene and one or more $C_3$-$C_{12}$ α-olefins, and having (i) ethylene-derived content greater than or equal to $C2_{first}$+3 wt %, based on the content of monomer-derived units in the second ethylene copolymer fraction; (ii) Mw at least 50,000 g/mol less than the Mw of the first ethylene copolymer fraction; and (iii) branching index g' within the range from 0.96 to 1.

2. The bimodal ethylene copolymer composition of claim 1, wherein the first ethylene copolymer fraction comprises polymer chains having a comb-branched structure.

3. The bimodal ethylene copolymer composition of claim 1, wherein the branching index g' of the second ethylene copolymer fraction is within the range from 0.98 to 1.

4. The bimodal ethylene copolymer composition of claim 1, wherein the second ethylene copolymer fraction has ethylene-derived content within the range from greater than 60 wt % to 80 wt %, and Mw within the range from 20,000 g/mol to 100,000 g/mol.

5. The bimodal ethylene copolymer composition of claim 1, wherein each of the first and second ethylene copolymer compositions consist essentially of units derived from ethylene and propylene.

6. The bimodal ethylene copolymer composition of claim 1, wherein the copolymer composition is made by copolymerization of ethylene and propylene in the presence of a first metallocene catalyst and a second metallocene catalyst, wherein the first metallocene catalyst has structure in accordance with Formula (I):

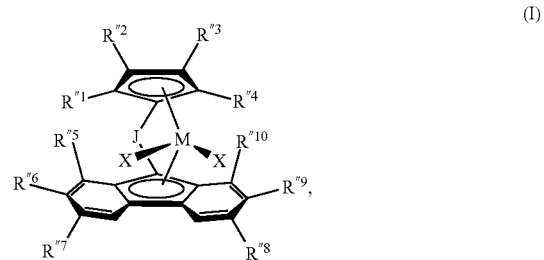

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$-$R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure;

further wherein the second metallocene catalyst has structure in accordance with Formula (II):

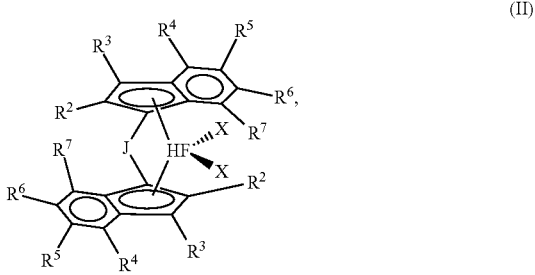

(II)

where: (1) J is a divalent bridging group comprising C, Si, or both; (2) M is Hf; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may be bonded together to form a saturated or partially saturated cyclic or fused ring structure.

7. The bimodal ethylene copolymer composition of claim 6, wherein the ratio of first metallocene catalyst to second metallocene catalyst used in the polymerization is within the range from 1:1 to 4:1.

8. The bimodal ethylene copolymer composition of claim 1, wherein the bimodal ethylene copolymer composition exhibits one or more of the following properties:
    (i) ethylene-derived content within the range from 40 to 70 wt %;
    (ii) Mw within the range from 100,000 to 400,000 g/mol;
    (iii) number-average molecular weight (Mn) within the range from 20,000 to 100,000 g/mol;
    (iv) molecular weight distribution (MWD, taken as Mw/Mn) within the range from 2.5 to 9; and
    (v) branching index g' within the range from 0.6 to 0.95.

9. A bimodal ethylene copolymer composition having:
    (i) ethylene-derived content within the range from 40 to 70 wt %;
    (ii) Mw within the range from 100,000 to 400,000 g/mol;
    (iii) Mn within the range from 20,000 to 100,000 g/mol;
    (iv) MWD (Mw/Mn) within the range from 2.5 to 9; and
    (v) branching index g' within the range from 0.6 to 0.95.

10. The bimodal ethylene copolymer composition of claim 9, wherein the ethylene-derived content is within the range from 50 to 60 wt %, the MWD is within the range from 3 to 8, and the branching index g' is within the range from 0.8 to 0.95.

11. The bimodal ethylene copolymer composition of claim 10, wherein the copolymer composition comprises a first ethylene copolymer fraction and a second ethylene copolymer fraction; and further wherein the first ethylene copolymer fraction has (i) higher Mw, (ii) lower ethylene-derived content, and (iii) lower g' than the second ethylene copolymer fraction.

12. The bimodal ethylene copolymer composition of claim 10, wherein the copolymer composition comprises:
    (a) a first ethylene copolymer fraction comprising units derived from ethylene and one or more $C_3$-$C_{12}$ α-olefins, and having (i) ethylene-derived content $C2_{first}$ within the range from 40 wt % to 60 wt %, based on the content of monomer-derived units in the first ethylene copolymer fraction; (ii) Mw within the range from 100,000 to 750,000 g/mol; and (iii) branching index g' of less than or equal to 0.95; and
    (b) a second ethylene copolymer fraction having units derived from ethylene and one or more $C_3$-$C_{12}$ α-olefins, and having (i) ethylene-derived content greater than or equal to $C2_{first}$+5 wt %, based on the content of monomer-derived units in the second ethylene copolymer fraction; (ii) Mw at least 50,000 g/mol less than the Mw of the first ethylene copolymer fraction; and (iii) branching index g' within the range from 0.96 to 1.

13. A process comprising:
    (a) polymerizing ethylene and propylene in the presence of both a first metallocene catalyst and a second metallocene catalyst;
        wherein the first metallocene catalyst has structure in accordance with Formula (I):

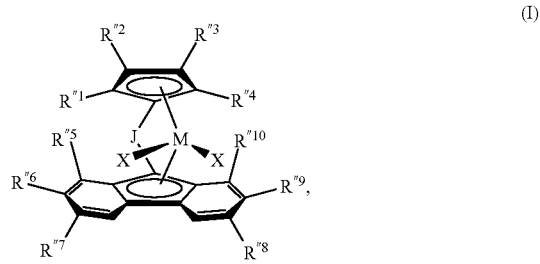

(I)

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$-$R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure;

further wherein the second metallocene catalyst has structure in accordance with Formula (II):

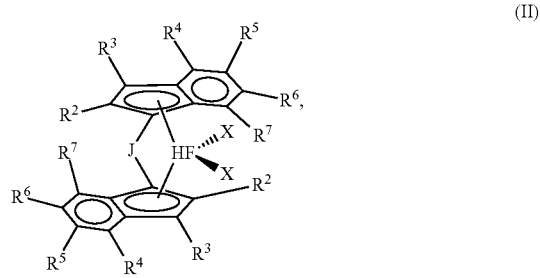

(II)

where: (1) J is a divalent bridging group comprising C, Si, or both; (2) M is Hf; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may be bonded together to form a saturated or partially saturated cyclic or fused ring structure; and (b) obtaining a copolymer composition having:
(i) ethylene-derived content within the range from 40 to 70 wt %;
(ii) Mw within the range from 100,000 to 400,000 g/mol;
(iii) Mn within the range from 20,000 to 100,000 g/mol;
(iv) MWD (Mw/Mn) within the range from 2.5 to 9; and
(v) branching index g' within the range from 0.6 to 0.95.

14. The process of claim 13, wherein the polymerizing takes place in a single polymerization reaction zone, and further wherein the molar ratio of the first metallocene catalyst to the second metallocene catalyst in the polymerization reaction zone is within the range from 1:1 to 4:1.

15. The process of claim 13, wherein the polymerizing takes place in a first polymerization reaction zone and a second polymerization reaction zone in series, such that said ethylene and propylene are polymerized in the presence of the second metallocene catalyst in the first polymerization reaction zone to obtain a first polymerization reaction effluent, which is then passed to the second polymerization reaction zone and copolymerized in the presence of the first metallocene catalyst.

16. The process of claim 13, wherein, in Formula (I): (1) $R'''^6$ and $R'''^9$ are each $C_1$ to $C_4$ alkyl; (2) $R'''^1$-$R'''^4$, $R'''^5$, $R'''^7$, $R'''^8$, and $R'''^{10}$ are each independently methyl, ethyl, or H; (3) J is p-$(Et)_3SiPh)_2C$; (4) M is Hf; and (6) each X is $C_1$-$C_3$ alkyl or halide.

17. The process of claim 16, wherein the first metallocene catalyst comprises 1,1'-bis(4-triethylsilylphenyl)methylene-(cyclopentadienyl)(2,7-di-tertiary-butyl-fluoren-9-yl)hafnium dimethyl.

18. The process of claim 13, wherein, in Formula (II): (1) each $R^4$ and $R^7$ is independently $C_1$-$C_5$ alkyl; (2) each $R^2$ is H or $C_1$-$C_5$ alkyl; (3) $R^3$, $R^5$, and $R^6$ are each independently H or $C_1$-$C_5$ alkyl; (4) J is cyclopentamethylenesilylene, cyclotetramethylenesilylene, cyclotrimethylenesilylene, cyclopropandiyl, cyclobutandiyl, cyclopentandiyl, or cyclohexandiyl; (5) M is Hf; and (6) each X is independently a halide or $C_1$-$C_3$ alkyl.

19. The process of claim 18, wherein the second metallocene catalyst comprises cyclotetramethylenesilylene-bis(2,4,7-trimethylinden-1-yl)hafnium dimethyl.

* * * * *